United States Patent
Fukasawa

(10) Patent No.: US 9,471,328 B2
(45) Date of Patent: Oct. 18, 2016

(54) INFORMATION PROCESSOR HAVING PROGRAM AND CONFIGURATION DATA STORED IN DIFFERENT STORAGE AREAS AND REFLECTING CONFIGURATION DATA IN OPERATION IN PROGRAM

(71) Applicant: Naoki Fukasawa, Kanagawa (JP)

(72) Inventor: Naoki Fukasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 603 days.

(21) Appl. No.: 13/790,362

(22) Filed: Mar. 8, 2013

(65) Prior Publication Data
US 2013/0246777 A1 Sep. 19, 2013

(30) Foreign Application Priority Data
Mar. 13, 2012 (JP) .................................. 2012-055316

(51) Int. Cl.
G06F 9/00 (2006.01)
G06F 9/44 (2006.01)
G06F 21/60 (2013.01)

(52) U.S. Cl.
CPC ........... G06F 9/4401 (2013.01); G06F 21/608 (2013.01)

(58) Field of Classification Search
CPC ... G06F 9/4401; G06F 9/4451; G06F 21/608
USPC ....... 726/16, 5; 719/327, 321; 358/1.15, 540
See application file for complete search history.

(56) References Cited

U.S. PATENT DOCUMENTS

| 7,264,743 B2 * | 9/2007 | Huang ................ H01L 21/0338 216/67 |
| 8,020,170 B2 | 9/2011 | Fukasawa |
| 8,264,743 B2 | 9/2012 | Fukasawa |
| 2006/0109529 A1 * | 5/2006 | Shimazawa ........ H04N 1/00846 358/540 |
| 2006/0224705 A1 * | 10/2006 | Takase .................. G06F 21/604 709/220 |
| 2008/0008508 A1 * | 1/2008 | Mizobuchi ............. G03G 21/02 399/389 |
| 2008/0263570 A1 * | 10/2008 | Fukasawa ............. G06F 9/4448 719/321 |
| 2009/0038002 A1 * | 2/2009 | Minegishi ............. G06F 21/608 726/16 |

(Continued)

FOREIGN PATENT DOCUMENTS

| EP | 1 710 680 A2 | 10/2006 |
| EP | 2 254 037 A2 | 11/2010 |

(Continued)

OTHER PUBLICATIONS

Extended European search report dated Jul. 17, 2013.

*Primary Examiner* — Aurel Prifti
(74) *Attorney, Agent, or Firm* — IPUSA, PLLC

(57) ABSTRACT

An information processor has a program stored in a first storage area. The program is installed when authenticated based on a comparison of authentication information generated from the pre-certified files of the program and authentication information of the pre-certified files written in an authentication information file. The pre-certified files include the authentication information file and a first configuration file that defines an operation of the program. When the program is executed, the information processor searches for a second configuration file that exists when the program is installed and has the same file configuration as the first configuration file. Configuration data written in the second configuration file are registered with a second storage area different from the first storage area, when the second configuration file is located by the search. The configuration data are reflected in the operation of the program when determined as being stored in the second storage area.

8 Claims, 22 Drawing Sheets

(56) References Cited

U.S. PATENT DOCUMENTS

| | | | |
|---|---|---|---|
| 2009/0251728 A1* | 10/2009 | Fukasawa | G06F 3/1204 358/1.15 |
| 2009/0268239 A1* | 10/2009 | Kawara | G06F 3/1206 358/1.15 |
| 2010/0211663 A1* | 8/2010 | Barboy | G06F 17/30233 709/223 |
| 2010/0225946 A1 | 9/2010 | Fukasawa | |
| 2010/0242037 A1* | 9/2010 | Xie | G06F 8/61 717/178 |
| 2010/0275220 A1* | 10/2010 | Chou | G06F 9/4411 719/327 |
| 2011/0058219 A1 | 3/2011 | Fukasawa | |
| 2011/0252416 A1* | 10/2011 | Kobayashi | G06F 9/4411 717/174 |
| 2011/0302637 A1* | 12/2011 | Hamada | G06F 3/1204 726/5 |
| 2011/0304873 A1* | 12/2011 | Smith | G06F 3/1205 358/1.15 |
| 2012/0197973 A1* | 8/2012 | Tukol | G06F 9/4451 709/203 |
| 2012/0293833 A1 | 11/2012 | Fukasawa | |
| 2015/0242195 A1* | 8/2015 | Omura | G06F 3/1204 719/327 |

FOREIGN PATENT DOCUMENTS

| | | |
|---|---|---|
| JP | 2005-182391 | 7/2005 |
| JP | 2006-209195 | 8/2006 |
| JP | 2009-271913 | 11/2009 |

* cited by examiner

FIG.5

PRINTER 300-1

| | SETTABLE VALUES | | | |
|---|---|---|---|---|
| | N | Y | | |
| Duplex | 1in1 | 2in1 | 4in1 | |
| Layout | Off | TopLeft | TopRight | Left |
| Staple | Off | Left | Right | |
| Punch | Letter | A4 | A3 | A5 |
| PaperSize | | | | |

↑ DEFAULT VALUE

FIG.6

```
<!-- config_patterns.xml -->    (CONFIGURATION FILE INSTRUCTION INFORMATION FILE)

<config_patterns>

<features>
    <feature name = "duplex"/>
    <feature name = "layout"/>
    <feature name = "staple"/>
    <feature name = "punch"/>
    <feature name = "papersize"/>
  </features>

<patterns>
    <pattern filename = "pattern01.xml"/>
    <pattern filename = "pattern02.xml"/>
  </patterns>

</config_patterns>
```

FIG.7A

```
<!-- pattern01.xml -->    (CONFIGURATION PATTERN FILE)
<config_pattern>

<pattern_name>Pattern 01</pattern_name>

<settings>
    <feature name = "duplex" value = "on"/>
    <feature name = "staple" value = "left"/>
</settings>

</config_pattern>
```

FIG.7B

```
<!-- pattern02.xml -->    (CONFIGURATION PATTERN FILE)
<config_pattern>

<pattern_name>Pattern 02</pattern_name>

<settings>
    <feature name = "layout" value = "2in1"/>
    <feature name = "punch" value = "on"/>
</settings>

</config_pattern>
```

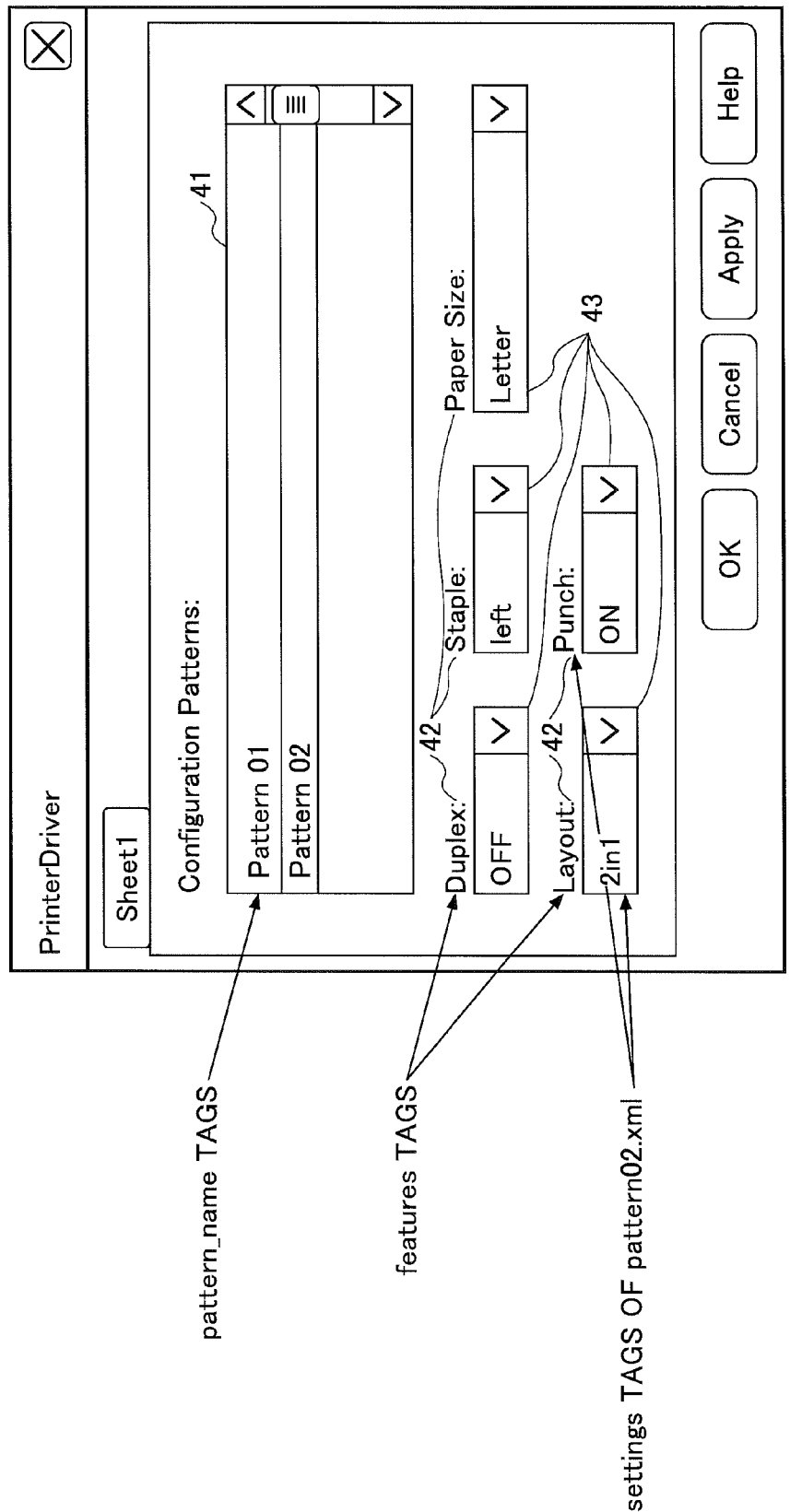

FIG.9

(CONFIGURATION FILE INSTRUCTION INFORMATION FILE)

```
<!-- config_patterns.xml -->

<config_patterns>

<patterns>
    <pattern filename = "custom01.xml"/>
    <pattern filename = "custom02.xml">
    <pattern filename = "pattern01.xml"/>
</patterns>

</config_patterns>
```

FIG.10A

```
<!-- custom01.xml -->
<config_pattern>

<pattern_name>Custom 01</pattern_name>

<settings>
        <feature name ="duplex" value = "on"/>
        <feature name ="layout" value = "2in1"/>
    </settings>

</config_pattern>
```
(CONFIGURATION PATTERN FILE)

FIG.10B

```
<!-- custom02.xml -->
<config_pattern>

<pattern_name>Custom 02</pattern_name>

<settings>
        <feature name ="duplex" value = "on"/>
        <feature name ="layout" value = "4in1"/>
    </settings>

</config_pattern>
```
(CONFIGURATION PATTERN FILE)

FIG.11

```
<!-- customregistry.xml -->

<values>
    <value name="custom_config_pattern::root" src="config_patterns.xml"></value>
    <value name="custom_config_pattern::custom01.xml" src="custom01.xml"></value>
    <value name="custom_config_pattern::custom02.xml" src="custom02.xml"></value>
</values>
```

INFORMATION PROCESSOR HAVING PROGRAM AND CONFIGURATION DATA STORED IN DIFFERENT STORAGE AREAS AND REFLECTING CONFIGURATION DATA IN OPERATION IN PROGRAM

CROSS-REFERENCE TO RELATED APPLICATION

The present application is based upon and claims the benefit of priority of Japanese Patent Application No. 2012-055316, filed on Mar. 13, 2012, the entire contents of which are incorporated herein by reference.

BACKGROUND OF THE INVENTION

1. Field of the Invention

The present invention relates to a recording medium in which a program is recorded that is subjected to authentication when a file is installed in a folder of an information processor by an operating system (OS).

2. Description of the Related Art

In the case of printing out a document using a printer, a user is allowed to determine printing settings on a setting screen displayed by a printer driver. The number of functional items that may be set (determined) by a user tends to increase as the printer becomes more sophisticated.

However, printer functions that are used by a user on a daily basis do not vary so widely that it is often the case that one of a few configuration patterns is employed. Therefore, a technique is known that dynamically provides a user with an optimum operating environment by writing a configuration pattern of printing conditions that a user sets using a printer driver in a format that is easy to change, such as text, and performing customization based on the file at the time of installation. (See, for example, Japanese Laid-Open Patent Application No. 2009-271913.)

Japanese Laid-Open Patent Application No. 2009-271913 discloses an information processor that includes a management part to manage the default values of printing conditions in an image forming apparatus, a recording part to set an identifier indicating a default value in a printing condition and to record a configuration pattern including a printing condition in which the identifier is set, and a setting part to set the default value obtained from the management part in the printing condition in response to the printing conditions included in the configuration pattern recorded by the recording part including the printing condition in which the identifier is set.

SUMMARY OF THE INVENTION

According to an aspect of the present invention, a computer-readable recording medium has a program recorded therein, wherein the program includes a pre-certified file to be authenticated, an authentication information file in which authentication information of the file to be authenticated is written, and a default configuration file defining an operation of the program, wherein the program is subjected to authentication based on a comparison of authentication information generated from the file to be authenticated and the authentication information of the authentication information file when the program is installed in an information processor, and wherein the program instructs a central processing unit to execute: when a configuration file of a predetermined filename exists in the information processor, registering configuration data written in the configuration file with a first storage area different from a second storage area in which the program is stored; determining whether the configuration data are stored in the first storage area; and when it is determined that the configuration data are stored in the first storage area, reflecting the configuration data in the operation of the program.

According to an aspect of the present invention, an information processor includes an authentication part configured to execute authentication, when a program package including a pre-certified file to be authenticated, an authentication information file in which authentication information of the file to be authenticated is written, and a default configuration file defining an operation of a program is installed, by comparing authentication information generated from the file to be authenticated and the authentication information of the authentication information file; a data registration part configured to, when a configuration file of a predetermined filename exists in the information processor, register configuration data written in the configuration file with a first storage area different from a second storage area in which the program of the program package is stored; a determination part configured to determine whether the configuration data are stored in the first storage area; and a configuration reflecting part configured to reflect the configuration data in the operation of the program when the determination part determines that the configuration data are stored in the first storage area.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 5 is a schematic diagram illustrating the repository of the functions, specifications, and performance of a printer according to the first embodiment;

FIG. 6 is a diagram illustrating a written example of a configuration file instruction information file "config_patterns.xml" in which one or more default configuration patterns are recorded according to the first embodiment;

FIGS. 7A and 7B are diagrams illustrating written examples of configuration pattern files "pattern01.xml" and "pattern02.xml," respectively, according to the first embodiment;

FIGS. 8A and 8B are diagrams illustrating UI screens that are displayed by a display part based on a configuration pattern instruction information file and the configuration pattern files according to the first embodiment;

FIG. 9 is a diagram illustrating a configuration file instruction information file "config_patterns.xml" with which customized configuration patterns are registered according to the first embodiment;

FIGS. 10A and 10B are diagrams illustrating written examples of configuration pattern files "custom01.xml" and "custom02.xml," respectively, according to the first embodiment;

FIG. 11 is a diagram illustrating a registration instruction file for registering the configuration file instruction information file and the configuration pattern files created by a system administrator with a PrinterDriverData registry according to the first embodiment;

DETAILED DESCRIPTION OF THE PREFERRED EMBODIMENTS

According to the conventional customization method, it is necessary to alter one of the files included in a printer driver package. When it is verified by a certificate authority that a device driver such as a printer driver is highly reliable, the device driver receives a digital signature (for example, a "Windows (registered trademark) logo" given by Microsoft® Corporation) for its package from the certificate authority. The digital signature is given by the certificate authority as a predetermined file (for example, a catalog (CAT) file), and a printer manufacturer is allowed to distribute the printer driver as a "certified driver" by including the predetermined file in the package.

However, when the above-described customization is performed, a file included in the printer driver package is altered. If a file included in the package is altered even by a single byte, the printer driver is regarded as a driver that is different from the certified driver. Therefore, there is a problem in that a message stating "Unreliable Driver" is displayed to a user at the time of installation, for example. It is difficult for a user to determine whether this message is due to customization or requires some action to be taken.

According to an aspect of the present invention, a recording medium is provided in which a program is recorded that prevents the certification that a driver is reliable from being canceled even when a configuration pattern is customized.

According to an aspect of the present invention, an information process is provided that prevents the certification that a driver is reliable from being canceled even when a configuration pattern is customized.

A description is given below, with reference to the accompanying drawings, of embodiments of the present invention.

[First Embodiment]

Figure 1:
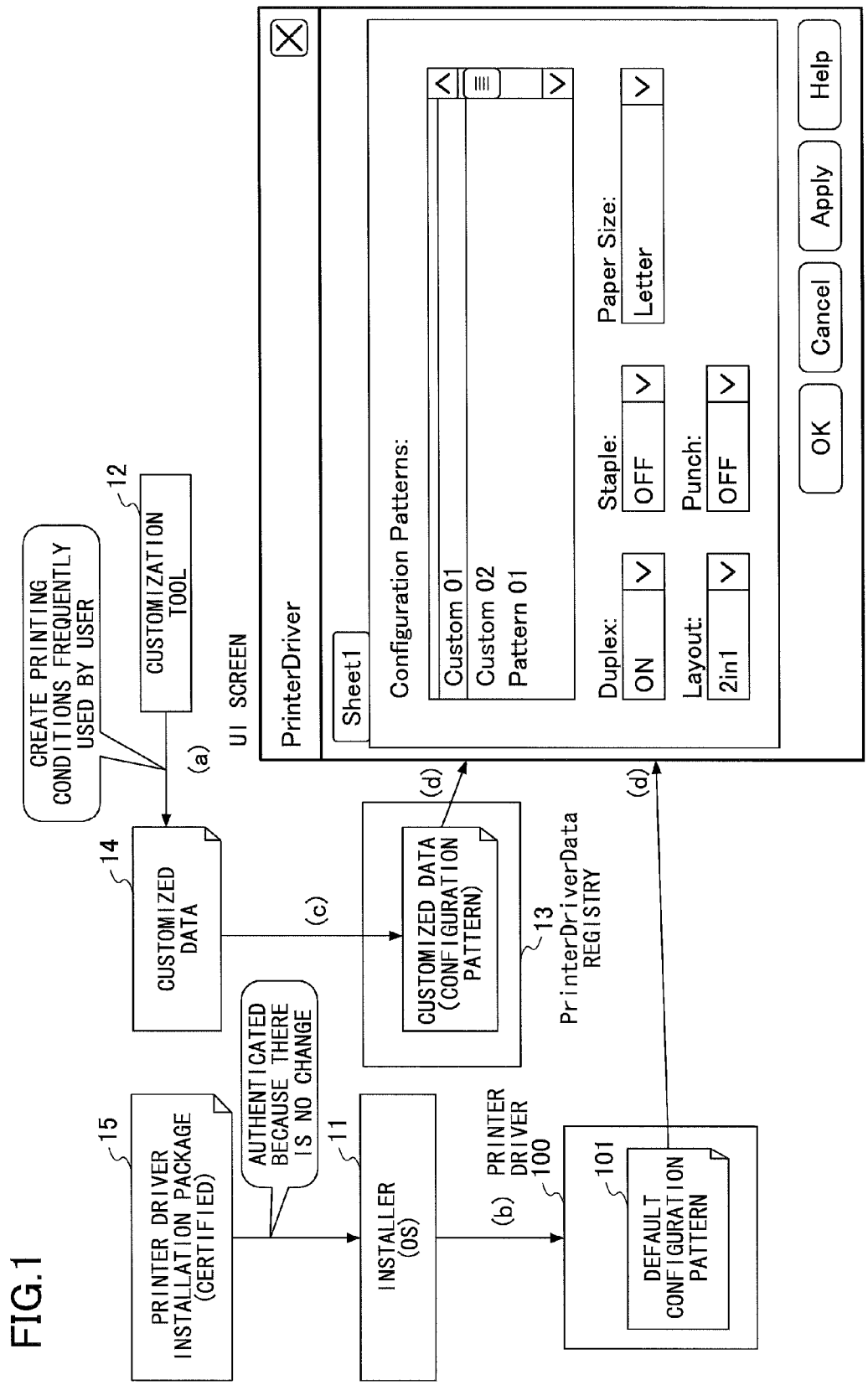
FIG. 1 is a diagram illustrating an outline of a printer driver according to a first embodiment.

FIG. 1 is a diagram illustrating an outline of a printer driver according to this embodiment.

(a) First, for example, a system administrator (or any person who has the authority to install a printer driver 100) sets one or more configuration patterns that are often used by one or more users using, for example, a customization tool 12. The customized configuration pattern is referred to as "customized data 14." The customized data 14 are not included in the modules of a printer driver installation package (hereinafter simply referred to as "package") 15 that includes the modules of the printer driver 100.

(b) A user is provided with the package 15 by a printer manufacturer. The package 15 has been certified by a manufacturer of an operating system (OS) and its certificate authority. An installer 11 requests the OS to install the package 15. The OS determines whether the contents of the package 15 have been falsified, referring to a CAT file. If no alteration or change is made to the package 15, the OS determines that the package 15 has not been falsified, and copies the package 15 to a system folder, for example.

In the package 15, a default configuration pattern 101 is recorded in advance.

(c) When the printer driver 100 is installed, the printer driver 100 writes the customized data 14 to a PrinterDriverData registry 13. The PrinterDriverData registry 13 is a data storage area prepared on a logical printer basis (that is, for each logical printer), where various kinds of data that determine a printer configuration (setting) are registered (recorded).

(d) As a result, the printer driver 100 is allowed to use both the default configuration pattern 101 and the configuration pattern of the customized data 14.

When the printer driver 100 is executed (for example, at the time of printing), the printer driver 100 refers to the PrinterDriverData registry 13. If the customized data 14 are registered with the PrinterDriverData registry 13, the customized data 14 are given preference, and if the customized data 14 are not registered with the PrinterDriverData registry 13, the default configuration pattern 101 is read out and a user interface (UI) screen is created.

By thus constructing the customized data 14 outside the configuration of the printer driver 100, the printer driver 100, which is an object of authentication, is prevented from being altered even by a single byte, and its certification is not canceled. Further, the printer driver 100 that supports the customized data 14 outside the configuration of the printer driver 100 installs the customized data 14. Therefore, it is possible to register the customized data 14 with the PrinterDriverData registry 13. The printer driver 100 operates referring to a configuration in the PrinterDriverData registry 13 with respect to each logical printer. Therefore, based on the customized data 14, it is possible to display a UI screen in which printing conditions frequently used by a user are set.

[Example Configuration]

Figure 2:
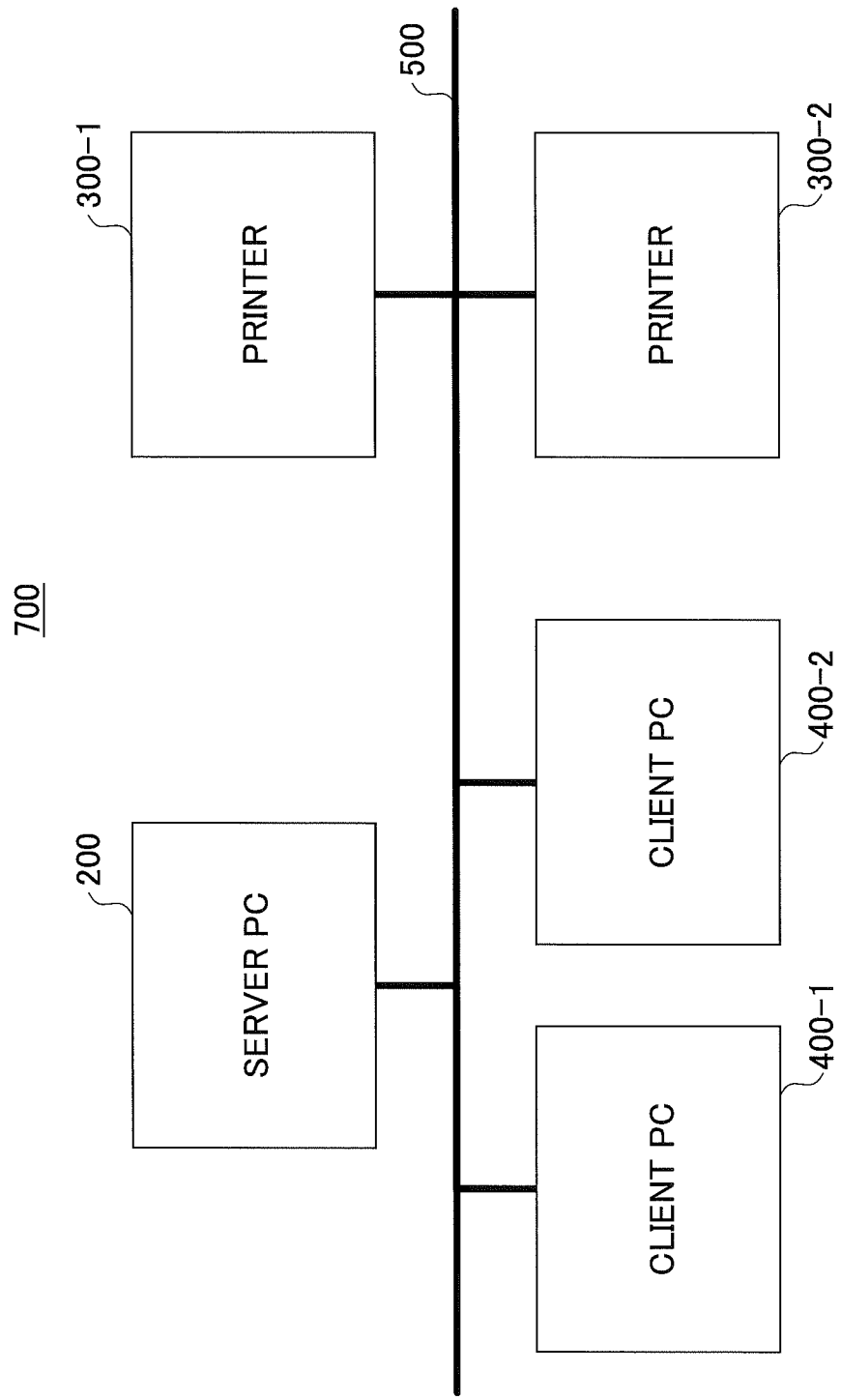
FIG. 2 is a block diagram illustrating a system configuration of an apparatus system in which the printer driver is used according to the first embodiment.

FIG. 2 is a block diagram illustrating a system configuration of an apparatus system 700 in which a printer driver is used. Referring to FIG. 2, a server personal computer (PC)

200, printers 300-1 and 300-2, and client PCs 400-1 and 400-2 are connected to a network 500. The printers 300-1 and 300-2 may be collectively referred to as "printer or printers 300" when no distinction is made between them. Likewise, the client PCs 400-1 and 400-2 may be collectively referred to as "client PC or PCs 400" when no distinction is made between them. A user may perform printing using one of the client PCs 400 and one of the printers 300. Further, if not performing printing, a user may cause the printer driver 100 to operate using one of the client PCs 400.

However, when there are the multiple printers 300-1 and 300-2, the effect is produced that it is possible to apply the customized data 14 to the multiple printers 300-1 and 300-2 as a result of the printer driver 100 outputting an alarm in response to application of the same customized data to the printers 300-1 and 300-2.

Examples of the network 500 include a local area network (LAN), a wide area network (WAN), and a virtual LAN (VLAN). The network 500 may also be multiple subnetworks connected to each other via a router. The network 500 may include the Internet. The network 500 may be either wired or wireless. Further, the printers 300 and the client PCs 400 may be directly connected without using the network 500.

The printer 300 is, for example, a multifunction peripheral (MFP). The MFP is an apparatus that integrates multiple functions such as a printer function, a facsimile (FAX) (transmission) function, a scanner function, and a copier (copying) function. In this embodiment, because a description is given mainly of the printer driver 100, it is sufficient for the MFP to have the function of the printer 300. However, a device driver is also used in FAX. Therefore, the functions that the MFP is desired to have may vary depending on the device driver.

The server PC 200 and the client PC 400 are common PCs or information processors. The client PC 400 may be a PC on which the printer driver 100 or the printer driver 100 and an application 412 (FIG. 3) run. Examples of the client PC 400 include a notebook PC, a tablet PC, and a smartphone, and are not limited by its name. Meanwhile, the client PC 400 is preferably a PC on which Microsoft Windows (registered trademark) (this notation is omitted hereinafter) may run. Hereinafter, unless otherwise explained, the OS refers to a Windows OS. However, an OS that has functions equivalent to those of the Windows OS described in this embodiment may also be used.

The OS of the server PC 200 is preferably a Windows server (OS) in view of affinity with the client PC 400. In this case, a device driver may be installed in the server PC 200 and the client PC 400 in the form of Point & Print. A description is given below of Point & Print.

Figure 3:
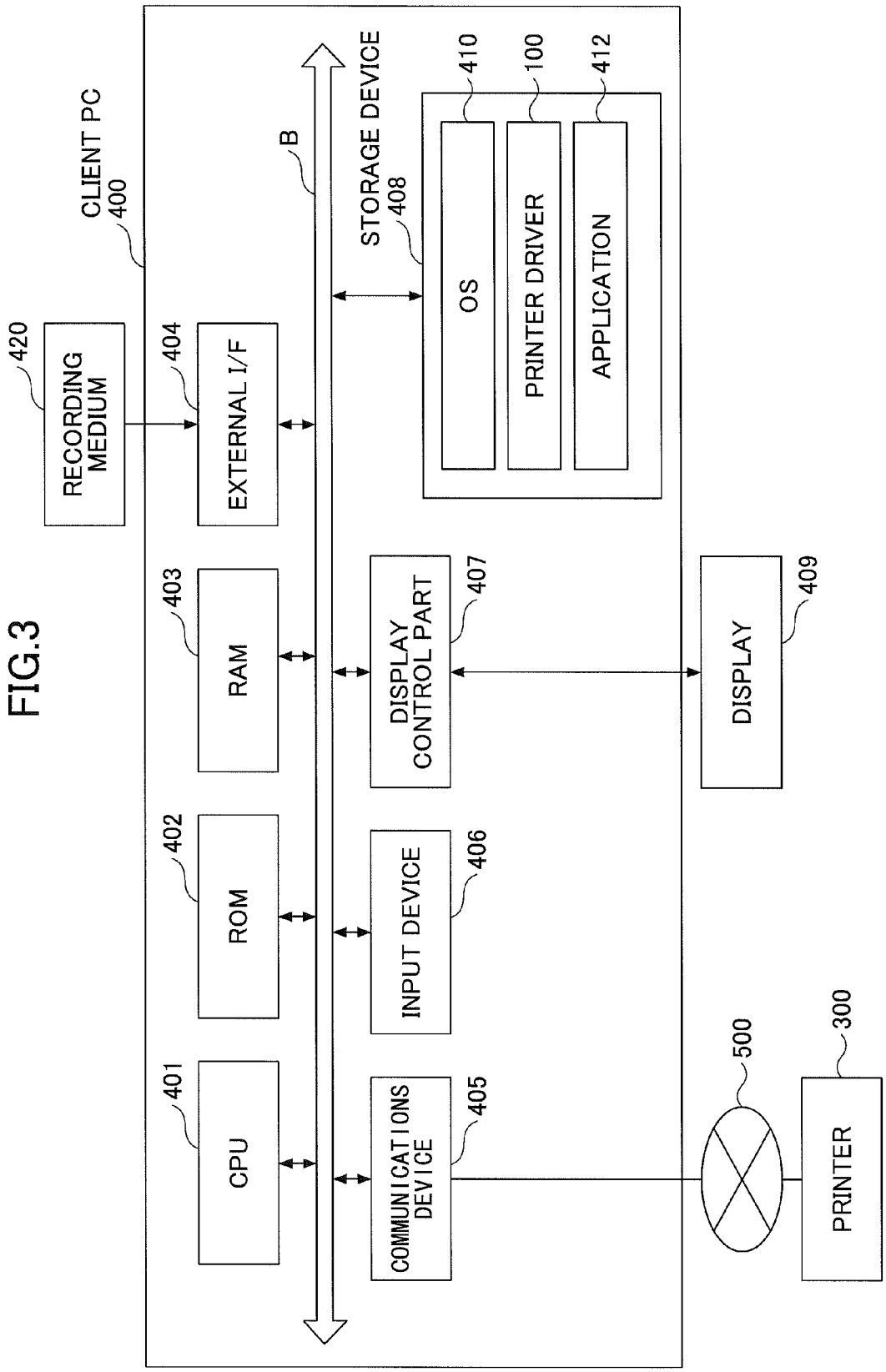
FIG. 3 is a block diagram illustrating a hardware configuration of a client PC according to the first embodiment.

FIG. 3 is a block diagram illustrating a hardware configuration of the client PC 400. The client PC 400 includes a central processing unit 401, a read-only memory (ROM) 402, a random access memory (RAM) 403, an external interface (I/F) 404, a communications device 405, an input device 406, a display control part 407, and a storage device 408, which are interconnected by a bus B. The CPU 401 executes the application 412 and the printer driver 100 on the OS using the RAM 403 as a work memory.

The application 412 may be any application that requests the printer 300 to perform printing. Examples of the application 412 vary and include document creation software, browser software, and presentation material creation software. The application 412 may be any application that can print document data that are an object of printing by creating, editing, displaying, and managing the document data. The document data include not only characters, symbols, and numeric values but also various objects of printing such as images and pictures.

The RAM 403 is a work memory (a main memory) that temporarily stores necessary data. The Basic Input/Output System (BIOS), default data, a boot program, etc., are stored in the ROM 402.

The external I/F 404 is an interface for attaching a cable such as a USB cable and a portable recording medium 420. The communications device 405 is a LAN card or an Ethernet (registered trademark) card, and transmits frame data (mainly print data in this embodiment) to the printer 300 based on instructions from the CPU 401.

The input device 406 is a user interface that receives a user's various operational instructions, and includes one or more of a keyboard, a mouse, a touchscreen panel, and an audio input device. The display control part 407 controls rendering on a display 409 with a predetermined resolution and a predetermined number of colors based on the screen information provided by the application 412. The display 409 is a liquid crystal or organic EL flat panel display (FPD). A UI screen is displayed on the display 409.

The entity of the storage device 408 is a non-volatile memory such as a hard disk drive (HDD) or a flash memory. The storage device 408 stores an OS 410, the application 412, and the printer driver 100. The recording medium 402 is a non-volatile memory such as an SD card or a USB memory. The printer driver 100 is distributed by way of being recorded in the recording medium 420 or being downloaded from the server PC 200. At the time of distribution, the printer driver 100 is often in the form of a package, and may be compressed, for example. Features according to this embodiment include the process of installing the printer driver 100 in the storage device 408 and the subsequent operation of the printer driver 100.

The server PC 200 has the same hardware configuration as the client PC 400, and accordingly, its description is omitted.

[Functions of Client PC (1)]

Figure 4:
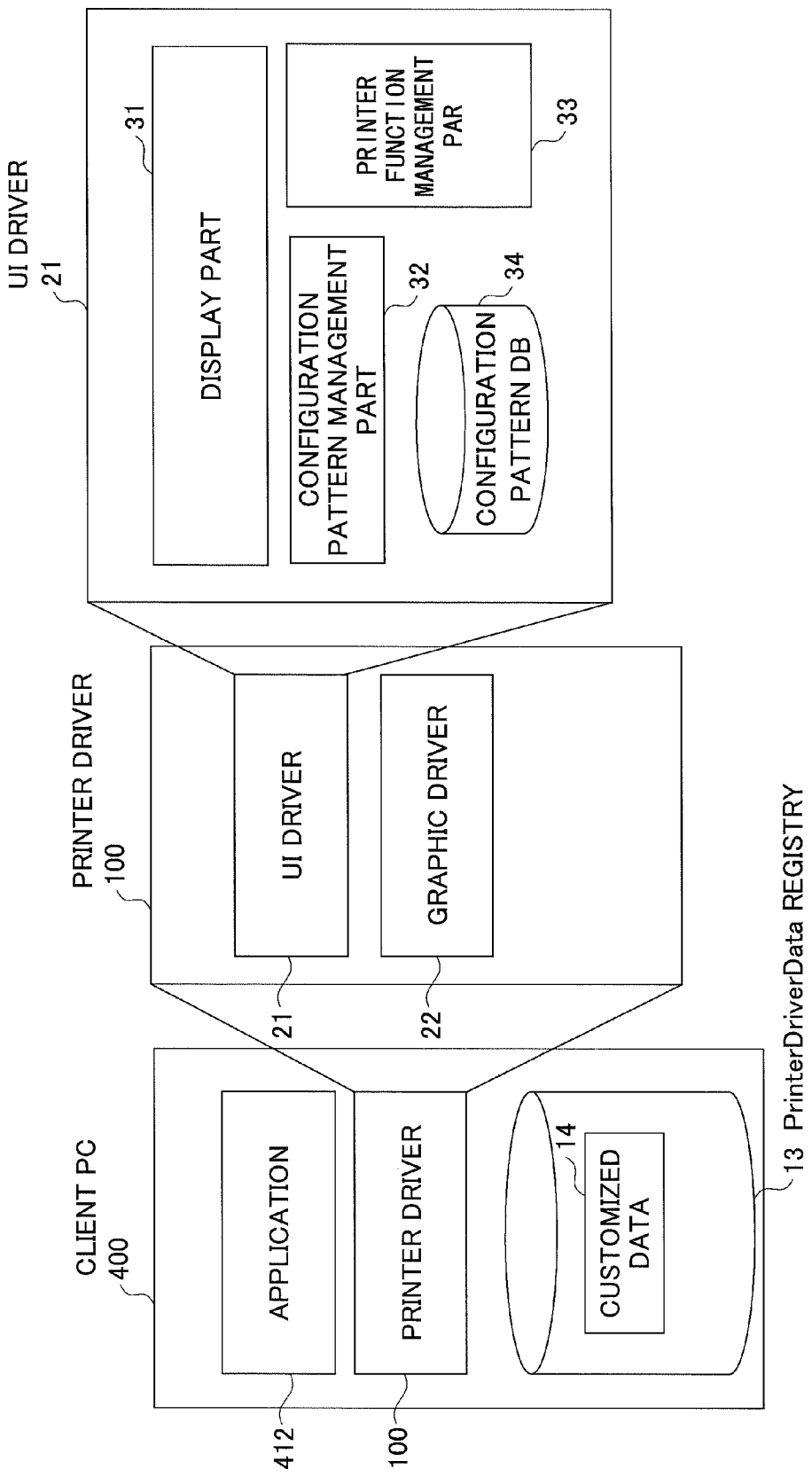
FIG. 4 is a schematic diagram illustrating functions of the client PC according to the first embodiment.

FIG. 4 is a schematic diagram illustrating functions of the client PC 400. In FIG. 4, it is assumed that the printer driver 100 has been installed in the client PC 400.

The client PC 400 includes the installed printer driver 100. Further, the client PC 400 includes a database called a registry in advance as a function provided by the Windows OS 410. The registry is a database capable of storing various configuration settings on a PC, such as the settings of the application 412, the settings of the device driver, and the settings of the Windows OS 410. In the past, there were times when the individual application 412 managed configuration information, while it is possible to perform configuration management with more efficiency through the centralized management by the Windows OS 410. It depends on the application 412 what information is to be registered with the registry. According to this embodiment, the customized data 14 are registered with (recorded in) the PrinterDriverData registry 13 at the time of installation.

The printer driver 100 includes the functions of a UI driver 21 and a graphic driver 22. The UI driver 21 displays, for example, the setting items of printing conditions in response to a request from the application 412, and receives printing settings determined by a user. Further, the graphic driver 22 creates print data in which the printing settings are reflected from document data, and transmits the print data to the printer via a spooler.

The UI driver 21 includes a display part 31, a configuration pattern management part 32, a printer function management part 33, and a configuration pattern database (DB) 34.

The display part 31 is a block that provides the above-described function of the UI driver 21.

The configuration pattern management part 32 is executed in response to reception of a command from the display part 31 when a user opens a UI screen.

The configuration pattern management part 32 displays a UI screen showing the names of multiple configuration patterns (the customized data 14 and/or the default configuration pattern 101) in a list. The configuration pattern management part 32 presents the setting conditions of the configuration patterns on the UI screen using the configuration patterns, and receives selection of a configuration pattern from a user.

When a user selects a configuration pattern, the configuration pattern management part 32 changes the UI screen based on the selected configuration pattern. When there are the customized data 14, the PrinterDriverData registry 13 is referred to in displaying the UI screen, and when there are not the customized data 14, the configuration pattern DB 34 is referred to in displaying the UI screen.

When printing is finally executed, values set in functions of the configuration pattern are provided to the graphic driver 22. For example, the settings of duplex printing and the number of copies are reflected in the result of printing.

The printer function management part 33 manages a repository (a database in which data are stored according to rules) that manages the functions, specifications, and performance of the printer 300.

FIG. 5 is a schematic diagram illustrating the repository of the functions, specifications, and performance of the printer 300. The printer function management part 33 manages "settable values" for each of the functions of the printer 300.

The printer function management part 33 communicates with the printer 300 to update the functions, specifications, and performance of the printer 300 at any time. Further, the default values of the functions are predetermined, and the printer function management part 33 may obtain the default values from the printer 300. For example, in the case of FIG. 5, the "settable values" at the left end are default values.

The printer function management part 33 may query the printer 300 about the properness of a value set as a printing setting with respect to each function.

One or more default configuration patterns 101 are registered with the configuration pattern DB 34. The single default configuration pattern 101 retains the setting items included in the UI screen displayed by the display part 31 together. For example, the functions and values are correlated like, for example, "Duplex Printing (Duplex): ON," "Combination Printing (Layout): 2 pages," and "Stapling (Staple): Top Left." The format (data description format) of a configuration pattern is common to the default configuration pattern 101 and a configuration pattern in the customized data 14.

[Configuration Pattern]

A description is given of the configuration pattern. The configuration pattern includes the default configuration pattern 101 stored in the configuration pattern DB 34 included in the package 15 and a customized configuration pattern stored in the PrinterDriverData registry 13.

[Default Configuration Pattern]

First, a description is given of the default configuration pattern 101 stored in the configuration pattern DB 34. Each default configuration pattern 101 is recorded in a configuration file instruction information file. The configuration file instruction information file is a root file for retrieving the default configuration pattern 101 by the printer driver 100. A file in which the printing conditions of the default configuration pattern 101 are set is a configuration pattern file. The customized data 14 have the same file configuration.

FIG. 6 is a diagram illustrating a configuration file instruction information file "config_patterns.xml". In this embodiment, each file is written in XML, while it is preferable to use a text-based file format such as YAML or JSON. The customized data 14 employs the same file format of a configuration pattern. This makes it easy for a system administrator to edit configuration patterns of the customized data 14.

In the configuration file instruction information, the overall configuration of configuration patterns is described.

Between "features" tags, the names of functions that may be included in a default configuration pattern are described in a list.

Between "patterns" tags, the configuration pattern file names of default configuration patterns are described in a list.

Thus, the functions that may be contained in each default configuration pattern 101 are written with the "feature name" attributes of the "features" tags. The values of these "feature name" attributes are "function names" displayed on the UI screen. The values of the "function names" are described in the configuration pattern files written between the "patterns" tags.

FIGS. 7A and 7B are diagrams illustrating written examples of the configuration pattern files "pattern01.xml" and "pattern02.xml" of default configuration patterns, respectively. Each of the configuration pattern files has a file name written with the "features" tags of the configuration file instruction information file. Both of the configuration pattern files have the same tags.

In the configuration pattern file, the individual (default) printing conditions that are included in the package 15 in advance by a manufacturer are described. According to conventional techniques, the certification of the package 15 is canceled when the system administrator alters this file.

Between "pattern_name" tags, a configuration pattern name given to the default configuration pattern (displayed as the name of a configuration pattern on the UI screen) is described. Between "settings" tags, setting values are described in the values of "value" attributes with respect to the values of the "features name" attributes (function names) described between the "features" tags of config_patterns.xml.

With respect to a function whose "value" attribute has a value of "@default" or a function that is described between the "features" tags of the configuration file instruction information file but is not described between the "settings" tags of the configuration pattern file, the printer driver 100 displays the default value of the function on the UI screen. As described above, the default value is managed by the printer function management part 33.

Figure 8A:
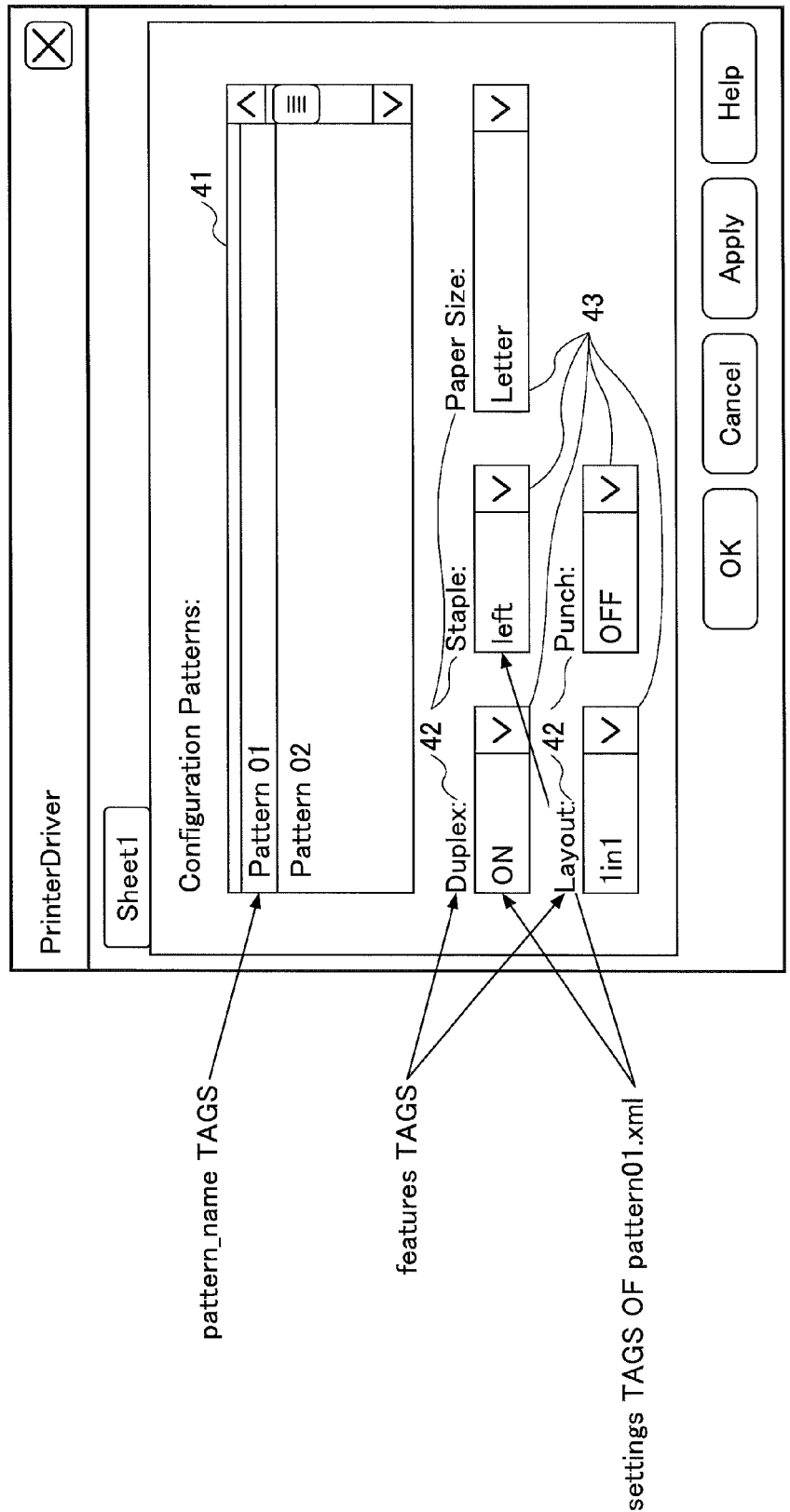

FIGS. 8A and 8B are diagrams illustrating UI screens that are displayed by the configuration pattern management part 32 based on the configuration pattern instruction information file and the configuration pattern files. In a "configuration patterns" area 41, the attributes (the names of the configuration patterns) described between the "pattern_name" tags of the configuration pattern files that are described between the "patterns" tags of the configuration pattern instruction information file are displayed. Further, in items 42, the names of the attributes (function names) described between the "features" tags of the configuration pattern instruction information file are displayed.

In the case of FIG. 8A, because a user has selected "Pattern01," the values of the "value" attributes (setting values) described between the "settings" tags of pattern01.xml are displayed in respective pull-down menus 43 of the items 42. In the case of FIG. 8B, because a user has selected "Pattern02," the values of the "value" attributes (setting values) described between the "settings" tags of pattern02.xml are displayed in the respective pull-down menus 43 of the items 42. In each case, a default value is displayed in any of the items 42 for which there is no description in the configuration pattern file.

A screen that enables more advanced settings is prepared as a UI screen, while in this embodiment, a description is given of a UI screen based on a screen that is customized. In this embodiment, both screens are referred to as the UI screen without making a distinction between them.

[Configuration Pattern of Customized Data]

The configuration file instruction information file and configuration pattern files of the customized data 14 are stored in the PrinterDriverData registry 13.

FIG. 9 is a diagram illustrating a configuration file instruction information file "config_patterns.xml" with which customized configuration patterns are registered. FIGS. 10A and 10B are diagrams illustrating written examples of configuration pattern files "custom01.xml" and "custom02.xml," respectively. The tags have the same meanings as those of the configuration pattern DB 34, and accordingly, their description is omitted.

The system administrator customizes configuration patterns based on the meanings of tags. It is possible for a system administrator with the knowledge of XML to create the configuration file instruction information file of FIG. 9 and the configuration pattern files of FIGS. 10A and 10B using a simple editor. Further, it is also preferable that a printer manufacturer or the like provide users with the customization tool 12. The customization tool 12 selectably displays values managed by the printer function management part 33 for the items of, for example, such a UI screen as illustrated in FIG. 8A or 8B. When the system administrator sets a value for each item, a customized configuration pattern file is created by receiving an input of (or automatically generating) the writing of the "pattern name" tags and a filename. The customization tool 12 creates a configuration file instruction information file by specifying the filename of this configuration pattern file as the value of the "pattern filename" attribute of the "patterns" tags.

In this embodiment, as illustrated in FIGS. 10A and 10B, the system administrator creates the two configuration pattern files "custom01.xml" and "custom02.xml." Further, as illustrated in FIG. 9, of the default configuration patterns, the system administrator registers "pattern01.xml" with the configuration file instruction information file so that "pattern01.xml" may be used after customization.

The comparison of FIG. 6 and FIG. 9 shows that the customized "config_patterns.xml" does not include the "features" tags. With respect to tags that are absent in the customized configuration file instruction information file, the configuration file instruction information file of the default configuration patterns is given preference. That is, by not writing the "features" tags, the system administrator gives an instruction to use the same settings as the "config_patterns.xml" of the default configuration patterns with respect to the "features" tags, and by writing the "patterns" tags, the system administrator gives an instruction to use "custom01.xml," "custom02.xml," and "pattern01.xml" by overwriting the "patterns" tags of "config_patterns.xml" in the default configuration file instruction information file.

[Registration Instruction File for Registering Configuration File Instruction Information File and Configuration Pattern Files with PrinterDriverData Registry 13]

FIG. 11 is a diagram illustrating a registration instruction file for registering the configuration file instruction information file and the configuration pattern files created (customized) by a system administrator with the PrinterDriverData registry 13. The registration instruction file "customregistry.xml" gives instructions as to how the configuration file instruction information file and the configuration pattern files are registered with the PrinterDriverData registry 13. The instructions described between "values" tags are as follows:

creating a value whose name is "custom_config_pattern::root" in the PrinterDriverData registry 13, and copying the contents of the file "config_patterns.xml" as the contents of the value;

creating a value whose name is "custom_config_pattern::custom01.xml" in the PrinterDriverData registry 13, and copying the contents of the file "custom01.xml" as the contents of the value; and creating a value whose name is "custom_config_pattern::custom02.xml" in the PrinterDriverData registry 13, and copying the contents of the file "custom02.xml" as the contents of the value.

The registration instruction file as well is created by the system administrator. It is possible for the system administrator to create the registration instruction file using the customization tool 12. In this case, the customization tool 12 may write the file names of the configuration pattern files created by the system administrator or the customization tool 12 between the "values" tags.

The filename of the configuration file instruction information file is fixed. Therefore, the filename of the configuration file instruction information file may be written between the "values" tags at the time of creating the registration instruction file or may be written in the template of the registration instruction file in advance.

After the contents of the configuration file instruction information file and the configuration pattern files are registered with the PrinterDriverData registry 13 (the files themselves are not registered, hence the "contents"), the registration instruction file is not used by the printer driver 100. However, because the registration instruction file is necessary at the time of registration, it is assumed that the customized data 14 include the registration instruction file as well.

The registration instruction file may not be necessary, and the contents of the registration instruction file may be described in, for example, "config_patterns.xml." However, independently creating the registration instruction file makes it possible to reuse the registration instruction file in the case of registering the customized data 14 with the PrinterDriverData registry 13 with respect to each logical printer. Further, it is easy to manage the customized data 14 on a logical printer basis.

[Functions of Client PC (2)]

Figure 12:
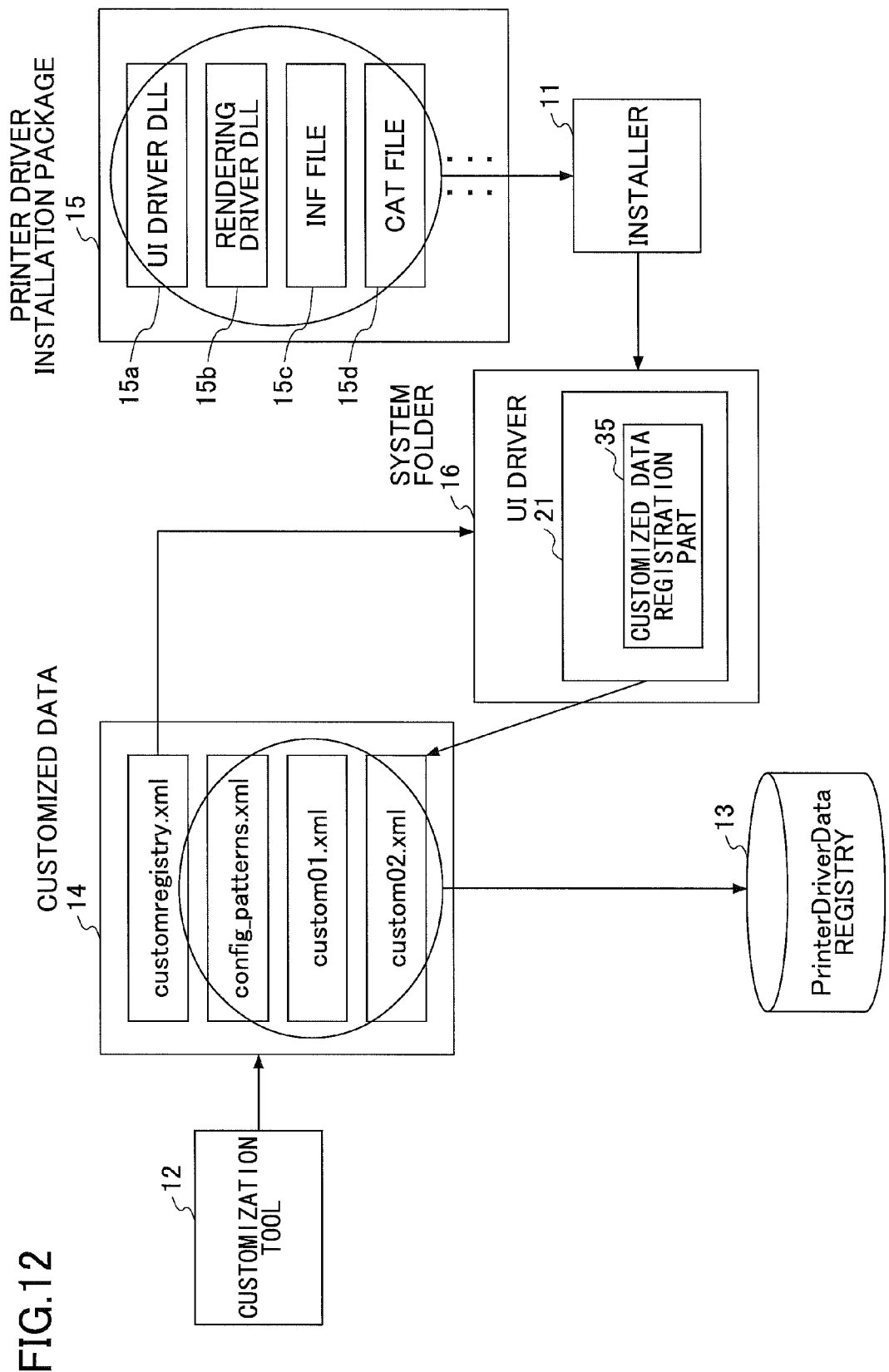
FIG. 12 is a schematic diagram illustrating functions of the client PC according to the first embodiment.

FIG. 12 is a schematic diagram illustrating functions of the client PC 400. Here, a description is given of a function in the case of installing the printer driver 100 in the client PC 400. The client PC 400 includes the customization tool 12, the customized data 14, the package 15, and the installer 11.

At the time of installation, for example, the customized data 14 created by the customization tool 12 and the package 15 are stored (contained) in predetermined files of the storage device 408 or in the recording medium 420.

The package 15 is a group of configuration files necessary to install the printer driver 100, and includes at least the following modules:

a UI driver DLL 15a for displaying the user interface of the printer driver 100 and managing the driver configuration;

a rendering driver DLL 15b for rendering an image;

an INF file 15c for showing the configuration of the printer driver 100 to the Windows OS 410; and a CAT file 15d provided by a Windows certification program.

The installer 11 is a utility for installing the printer driver 100. The printer driver 100 may be manually installed by a user. However, such manual installation is difficult for general users. Therefore, the installer 11 is commonly added to the package 15.

The installer 11 installs the printer driver 100 in the client PC 400 in cooperation with the Windows OS 410. This makes it possible for the Windows OS 410 to determine whether the package 15 is certified. The installer 11 and the Windows OS 410 receive a user's settings, and copy the contents of the package 15 to (or expand its compressed files in) a system folder 16 (for example, System32) or a driver folder of the client PC 400. The Windows OS 410 executes a series of processes necessary for the installation of a device driver.

In this embodiment, after the copying, the printer driver 100 registers the customized data 14 with the PrinterDriverData registry 13. Referring to FIG. 12, the UI driver 21 includes a customized data registration part 35 that executes this process. The customized data registration part 35 may be included in the printer driver 100.

The customized data registration part 35 registers the customized data 14 with the PrinterDriverData registry 13. Therefore, the customized data registration part 35 needs to know or search for the location of the customized data 14. In the case of using the customization tool 12, the customization tool 12 outputs the customized data 14 to a predetermined folder (or directory). Examples of the "predetermined folder" include a folder created with a name that is the same as or includes the name (of which characters unusable in a file system are appropriately escaped) of the logical printer 300 to be introduced immediately below a system temporary folder. This folder also is created by the customization tool 12. The name of the logical printer 200 is, for example, given by the system administrator or given by the customization tool 12 with reference to the package 15.

The customization tool 12 outputs the file of the customized data 14 below the system temporary folder. The customized data registration part 35 retrieves the customized data 14 from this location. As a result, when a system administrator creates a large number of logical printers in a large organization, it is possible to create the customized data 14 for each logical printer, so that it is easy to change the contents of customization on a logical printer basis.

When the system administrator creates the customized data 14 without using the customization tool 12, the system administrator creates this predetermined folder and copies the file of the customized data 14 to the predetermined folder.

The logical printer is displayed as the icon of the printer 300 in the printer folder of the Windows OS 410. Multiple logical printers may be created for the single package 15. The logical printer may be a virtual output destination for the application 412. The print data rendered by the logical printer are provided from the logical printer to the physical printer 300 by the Windows OS 410.

Logical printers may be given respective names. The name of the logical printer may be any name given by the system administrator or automatically given from the package name of the printer driver 100. It is possible to set functions, whether to be shared, the form of spooling, and the configuration of options with respect to the logical printer.

The customized data registration part 35 first reads the registration instruction file "customregistry.xml" of the customized data 14, and identifies values to be created in the PrinterDriverData registry 13 and the contents of the values. Then, the customized data registration part 35 registers these values and their contents with the PrinterDriverData registry 13.

Figure 13:
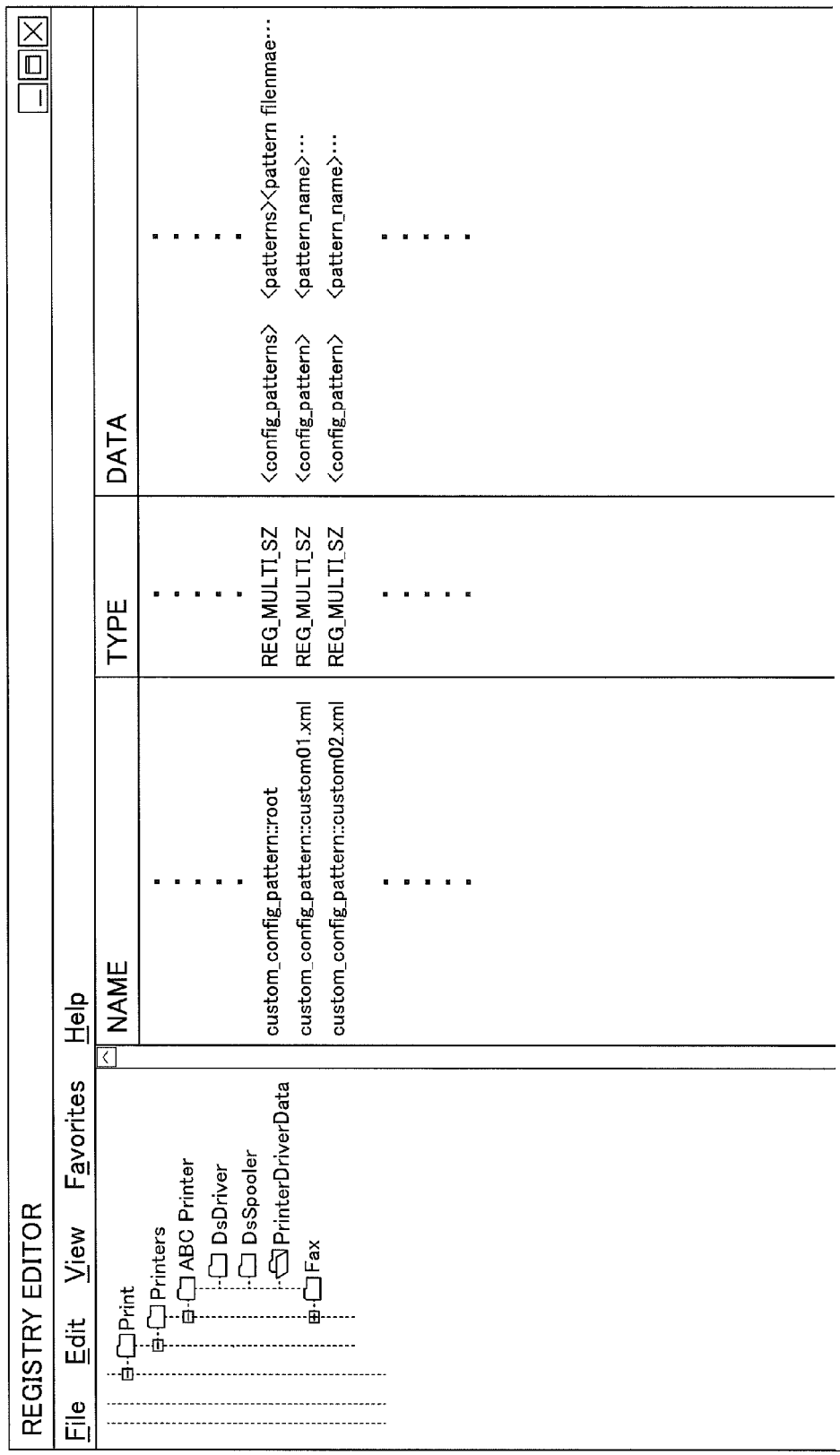
FIG. 13 is a schematic diagram for illustrating customized data registered with the PrinterDriverData registry according to the first embodiment.

FIG. 13 is a schematic diagram for illustrating the customized data 14 registered with the PrinterDriverData registry 13. FIG. 13 illustrates an example screen displayed by a registry editor, where the "type" (binary, text, etc.) of data and the "data" are registered for a "name." The printer driver 100 operates referring to the PrinterDriverData registry 13. The actual data, which are given in hexadecimal and may be encrypted, are not displayed in text.

[Operational Procedure at Installation Time]

Figure 14:
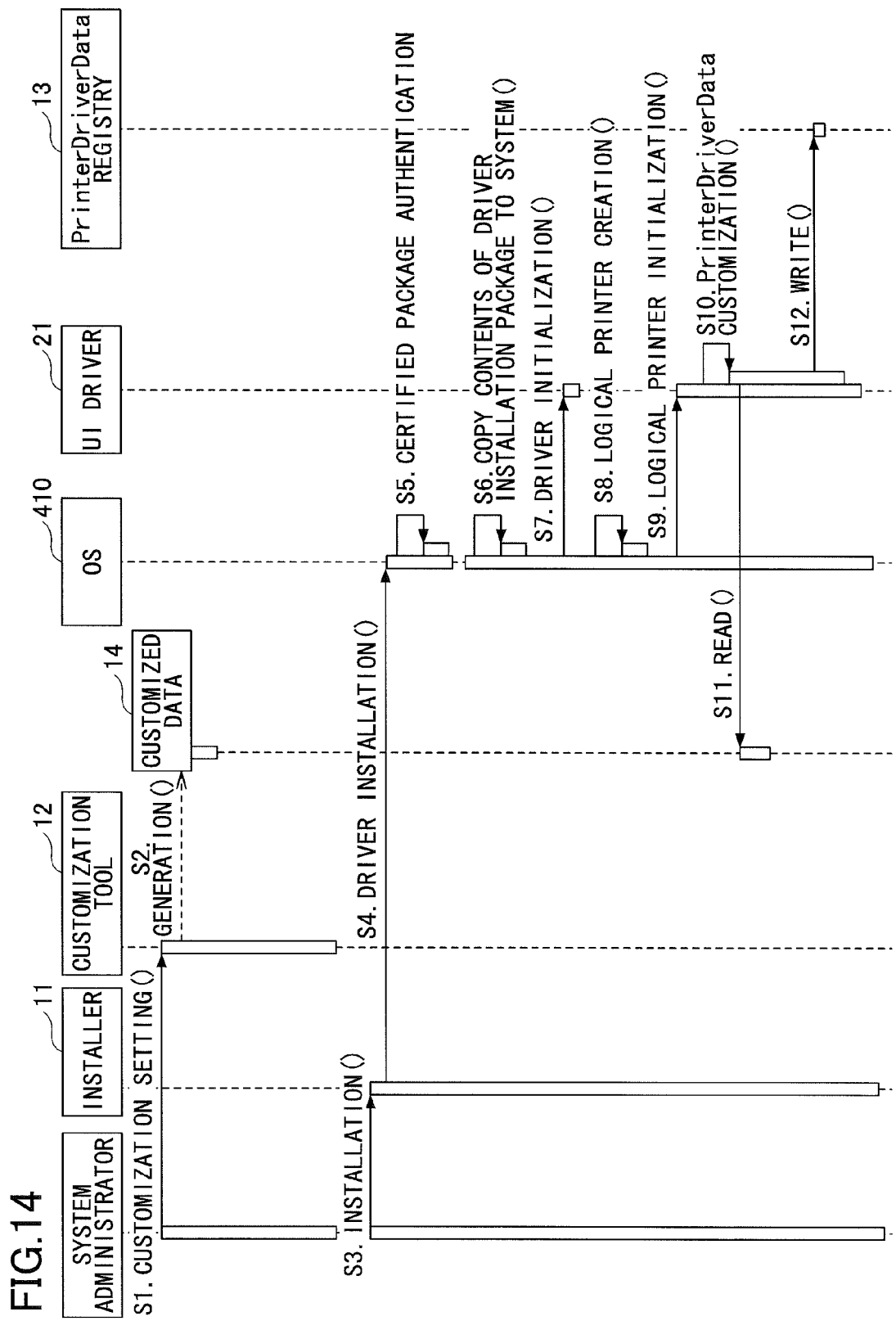
FIG. 14 is a sequence diagram illustrating a procedure for installing a package by the system administrator according to the first embodiment.

FIG. 14 is a sequence diagram illustrating a procedure for installing the package 15 by a system administrator.

The system administrator creates the customized data 14 using, for example, the customization tool 12 (steps S1 and S2). The customization tool 12 outputs the customized data 14 to a predetermined folder.

Next, the system administrator executes the installer 11 to request the Windows OS 410 to install the printer driver 100 (steps S3 and S4). Because the installer 11 and the package 15 are bundled, the location of the package 15 is specified for the installer 11.

The Windows OS 410 reads the INF file 15c of the package 15, and determines whether a necessary file is included in the package 15. The INF file 15c controls the installation of the package 15 of the printer driver 100. When a reference line to the CAT file 15d is written in the INF file 15c, the Windows OS 410 authenticates the package 15 (step S5).

In the case of successful authentication, the Windows OS 410 copies the modules of the package 15 to the system folder 16 (step S6). The Windows OS 410 executes processing such as the registration of the printer driver 100 with the system.

Next, the Windows OS 410 calls the UI driver 21 and causes the UI driver 21 to initialize the printer driver 100 (step S7). The printer driver 100 executes necessary processing such as initialization. Because the PrinterDriverData registry 13 is an area set (determined) on a logical printer basis, no registration is performed with the PrinterDriverData registry 13 at this stage.

The Windows OS 410 creates a logical printer (step S8). The Windows OS 410 calls the UI driver 21 and requests settings such as initialization necessary for the printer driver 100 (step S9). The UI driver 21 registers, for example, default setting values managed by the printer function management part 33 with the logical printer.

The UI driver 21 customizes the PrinterDriverData registry 13 in a setup process for providing various settings as default values for the logical printer (step S10). That is, the customized data registration part 35 identifies the location of the customized data 14 and reads the customized data 14 (step S11).

Thus, by registering the customized data 14 in the initial setting of the logical printer, it is possible to customize a configuration pattern on a logical printer basis while retaining the certification of the Windows logo program.

Then, the customized data registration part 35 searches for the registration instruction file "custom_registry.xml." When the registration instruction file exists, the customized data registration part 35 registers the contents of a configuration file instruction information file and configuration parameter (pattern) files with the PrinterDriverData registry 13 based on the contents of the registration instruction file (step S12).

Thus, because the customized data 14 are outside the configuration of the package 15, no alteration or change is made to the components inside the package 15. Therefore, it is possible to install the printer driver 100 without cancellation of the Windows logo program. Further, by registering the customized data 14, it is possible to flexibly customize printing conditions frequently used on the user side.

[Creation of UI Screen]

Figure 15:
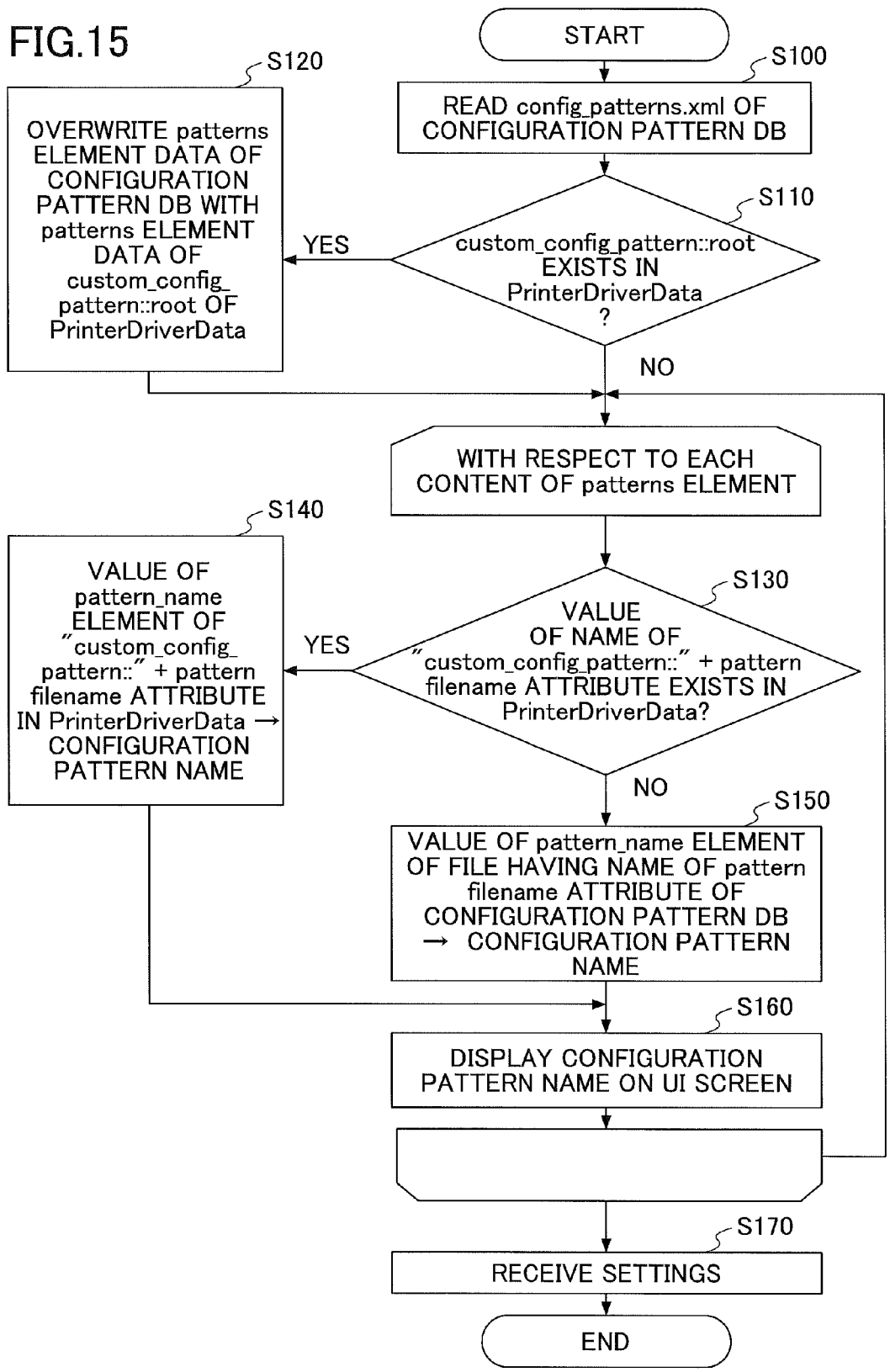
FIG. 15 is a flowchart illustrating a procedure for the creation of a UI screen by a configuration pattern management part according to the first embodiment.

FIG. 15 is a flowchart illustrating a procedure for the creation of a UI screen by the configuration pattern management part 32 (FIG. 4). The procedure of FIG. 15 is executed by the configuration pattern management part 32 in response to reception of a command from the display part 31 when a user performs an operation from the application 412 to cause a UI screen to be displayed.

First, at step S100, the configuration pattern management part 32 reads the configuration file instruction information file "config_patterns.xml" stored in the configuration pattern DB 34. The functions ("features") and the configuration pattern files ("patterns") of the printer 300 are read based on the configuration file instruction information file.

Next, at step S110, the configuration pattern management part 32 determines whether "custom_config_pattern::root" exists in the PrinterDriverData registry 13. If the customized data 14 are registered (if the configuration patterns have been customized by the system administrator), "custom_config_pattern::root" exists in the PrinterDriverData registry 13.

If the configuration patterns have been customized (YES at step S110), at step S120, the configuration pattern management part 32 replaces (overwrites) the attributes described between the "patterns" tags of the configuration file instruction information file read from the configuration pattern DB 34 with the values of the "pattern file" attributes of the configuration file instruction information file registered with "custom_config_pattern::root" of the PrinterDriverData registry 13. As a result, the customized configuration pattern files "custom01.xml," "custom02.xml," and "pattern01.xml" are made valid.

If the configuration patterns are not customized (NO at step S110), the values of the "pattern filename" attributes of the configuration file instruction information file read from the configuration pattern DB 34 are retained as they are.

Next, the following process is repeated with respect to each content of the "patterns" element (configuration pattern file).

First, at step S130, the configuration pattern management part 32 determines whether the value of a name connecting "custom_config_pattern::" and the "pattern filename" attributes ("custom01.xml," "custom02.xml," and "pattern01.xml" in FIG. 9) exists in the PrinterDriverData registry 13. This determination is "NO" if the configuration patterns are not customized.

If a name of "custom_config_pattern::" plus the "pattern filename" attributes exists (YES at step S130), at step S140, the contents of the configuration pattern file are registered with the PrinterDriverData registry 13. Accordingly, the value of the "pattern_name" element of the name is obtained as a "configuration pattern name."

If a name of "custom_config_pattern::" plus the "pattern filename" attributes does not exist (NO at step S130), at step S150, the value of the "pattern_name" element of the configuration pattern DB 34 is obtained as a "configuration pattern name."

At step S160, the configuration pattern management part 32 adds the "configuration pattern name" to the list of the "configuration patterns" area 41 of the UI screen.

The above-described process is repeated for each content of the "patterns" element (configuration pattern file), so that "custom01.xml," "custom02.xml," and "pattern01.xml" are displayed in the "configuration patterns" area 41 of the UI screen.

In the settings of the items 42 and the pull-down menus 43 of the UI screen, the values of the "features" element of the configuration file instruction information file read from the configuration pattern DB 34 are used for the items 42. The configuration pattern file read from the configuration pattern DB 34 or the values of the "setting" element of the PrinterDriverData registry 13 are used for the default values of the pull-down menus 43. This is described in detail below.

Thereafter, at step S170, in response to the user depressing, for example, an OK button, the display part 31 of the printer driver 100 receives the settings.

Figure 16:
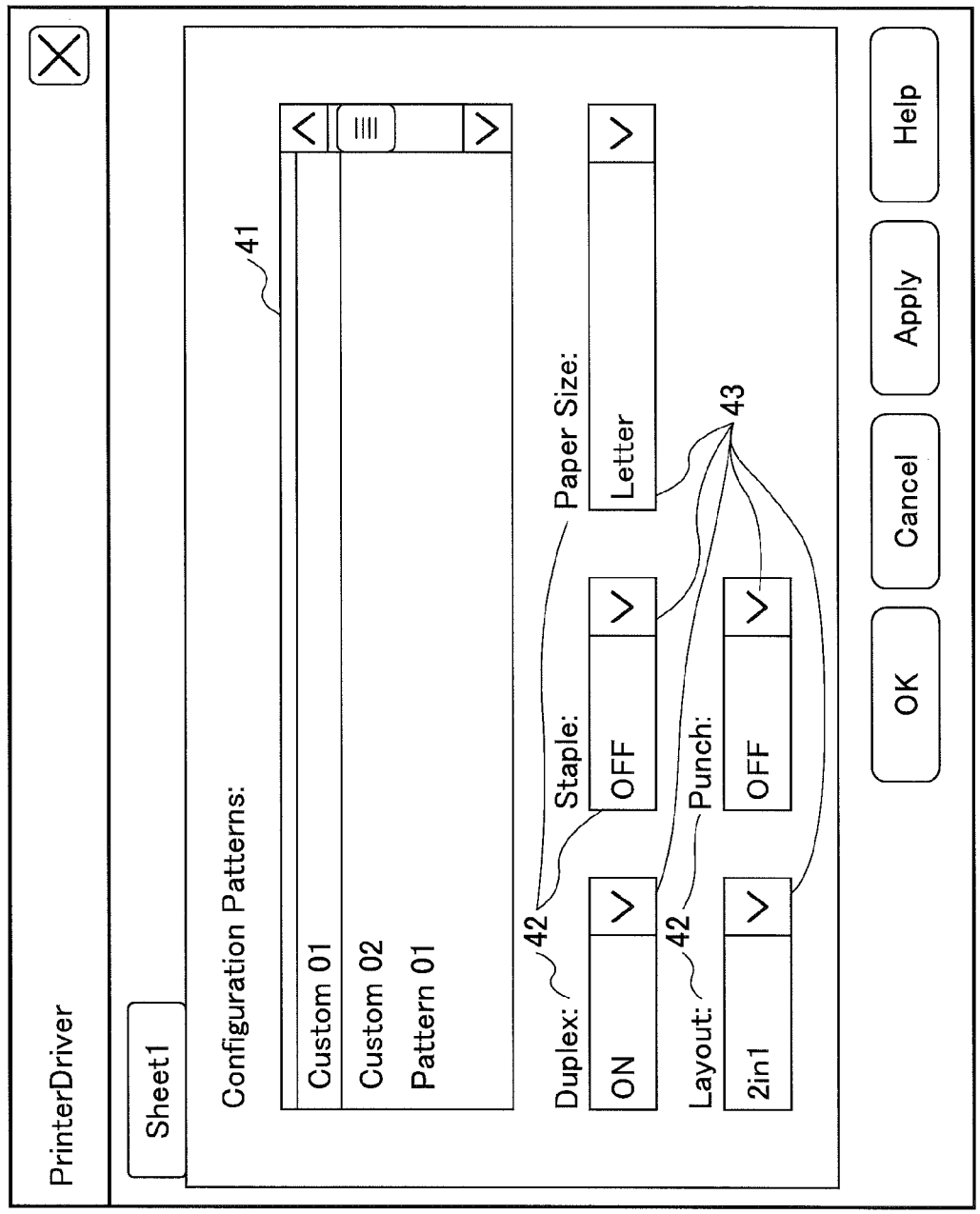
FIG. 16 is a diagram illustrating an example of the UI screen according to the first embodiment.

FIG. 16 is a diagram illustrating a UI screen. The "configuration pattern names" created by the customization by the system administrator are displayed in the "configuration patterns" area 41. The values of the items 42 may selected from the respective pull-down menus 43 by the user. The values of the pull-down menus 43 are managed by the printer function management part 33.

Figure 17:
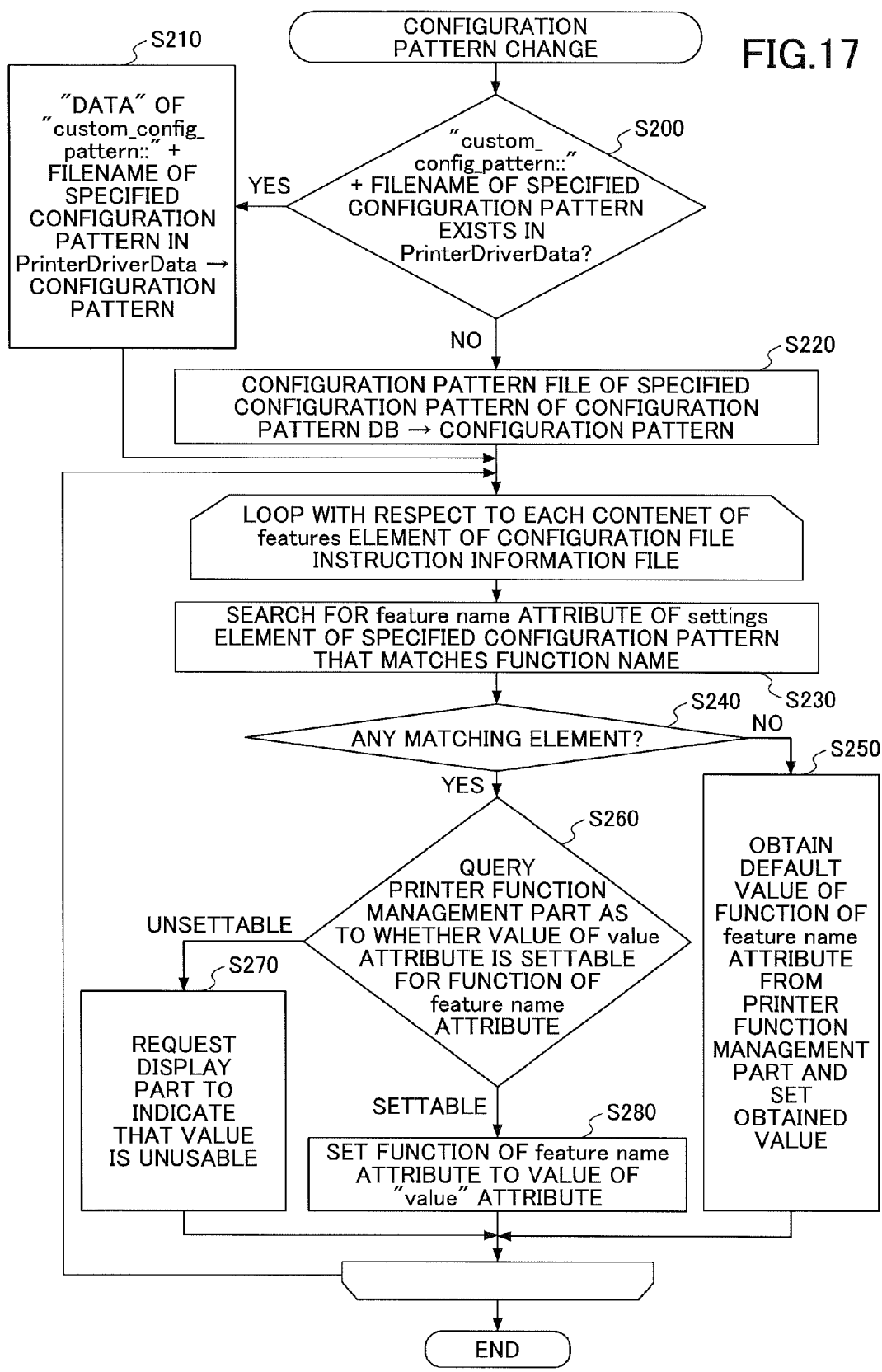
FIG. 17 is a flowchart illustrating a procedure executed by the configuration pattern management part when a user selects a configuration pattern on the UI screen according to the first embodiment.

FIG. 17 is a flowchart illustrating a procedure executed by the configuration pattern management part 32 when a user selects a configuration pattern on the UI screen.

First, at step S200, the configuration pattern management part 32 determines whether a name connecting "custom_config_pattern::" and the "filename" of a configuration pattern file in which the configuration pattern name ("custom01," "custom02," or "pattern01") selected by the user is written between the "pattern name" tags exists in the PrinterDriverData registry 13.

If a name of "custom_config_pattern::" plus the "filename" exists in the PrinterDriverData registry 13 (YES at step S200), at step S210, the "data" recorded at the "custom_config_pattern::" plus "filename" of the PrinterDriverData registry 13 are obtained as the contents of the configuration pattern.

If a name of "custom_config_pattern::" plus the "filename" does not exist in the PrinterDriverData registry 13 (NO at step S200), at step S220, the configuration pattern file of the configuration pattern name selected by the user is read from the configuration pattern DB 34 and is treated as a configuration pattern.

Next, the following process is repeated with respect to each content of the "features" element of the configuration file instruction information file (config_patterns.xml). If the configuration file instruction information file is created by merging that of the configuration pattern DB 34 with that of the PrinterDriverData registry 13 in the process of FIG. 15, each content of the "features" element is extracted.

At step S230, the configuration pattern management part 32 searches for a "feature name" attribute value of the "settings" element of the user-selected configuration pattern that matches the "function name" of the "features" element in process.

If there is no "future name" attribute whose value matches the "function name" (NO at step S240), the value of the "value" attribute of the function is unknown. Therefore, at step S250, the default value of the "function name" of the "features" element in process is obtained from the printer function management part 33, and the value is set (determined) as the setting value of the function.

Making a default value available makes it unnecessary for the system administrator to write a function and its value that do not have to be changed from those within the default configuration pattern to the customized data 14, thus making it easy to create the customized data 14. Further, in the case of customizing only a function that is common to multiple machine types while using a default configuration pattern for a function that is highly dependent on the machine type, the same customized data 14 may be reused for the multiple machine types.

If there is a "future name" attribute whose value matches the "function name" (YES at step S240), at step S260, the configuration pattern management part 32 queries the printer function management part 33 as to whether the value of the "value" attribute of the "settings" element of the configuration pattern may be used in correlation with the "function."

If the value of the "value" attribute is "@default," there is no need to query the printer function management part 33.

If the printer function management part 33 makes an affirmative response (YES at step S260), at step S280, the value of the "value" attribute of the "settings" element of the configuration pattern is set (determined) as a setting value for the "function name" of the "features" element in process.

If the printer function management part 33 makes a negative response (NO at step S260), at step S270, the configuration pattern management part 32 requests the display part 31 to display a message to the effect that the value of the "value" attribute may not be used for the "function name" of the "features" element in process. For example, the display part 31 displays a message: "ERROR. FAILED TO SET VALUE XX FOR FUNCTION YY."

Thus, the printer driver 100 according to this embodiment installs the customized data 14 of a configuration file separately from the package 15. Therefore, the Windows logo is not canceled. Further, because a UI screen is created, preferentially using the customized data 14, it is possible to customize the UI screen. Even if the customized data 14 are deleted, the printer driver 100 includes one or more default configuration pattern files. Accordingly, it is possible for a user to select a configuration pattern.

A description is given of this embodiment taking the printer driver 100 as an example, while this embodiment may also be applied to a FAX driver in the same manner. Further, a description is given of this embodiment taking a UI screen for setting printing conditions as an example, while this embodiment may be suitably applied to a form of use where the default values of a device driver are managed at a certificate authority and customization is performed on the user side.

[Application to Point & Print]

Figure 18:
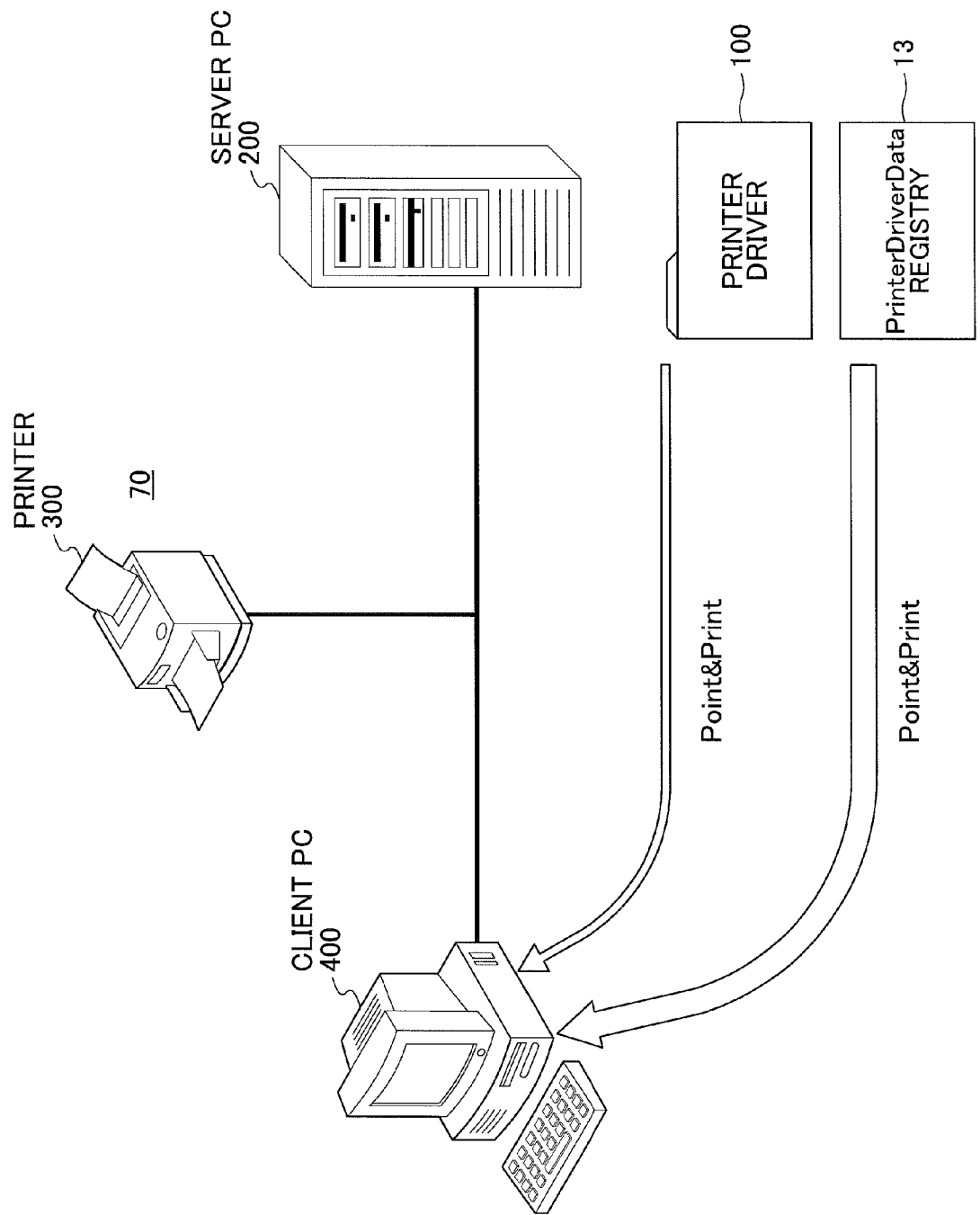
FIG. 18 is a diagram illustrating an outline of Point & Print according to the first embodiment.

FIG. 18 is a diagram illustrating an outline of Point & Print. Point & Print is a form of installation of the printer driver 100 by the Windows OS. The Windows OS is installed in the server PC 200 and the client PC 400. (A Windows OS for a server is installed in the server PC 200.)

The client PC 400 may make a print request to the printer 300 using this server PC 200 as a print server. In this system, the same printer driver 100 needs to be installed in both the server PC 200 and the client PC 400. It is very costly to install the printer driver 100 in each individual client PC 400 on the network 500 by a system administrator or the like.

In order to eliminate this inconvenience, Point & Print makes it possible to have the printer driver 100 downloaded from the server PC 200 to be installed in the client PC 400. This is a standard function of the Windows OS.

A system administrator first installs the printer driver 100 in the server PC 200. At this point, as described above, the customized data 14 are registered with the PrinterDriverData registry 13 of the server PC 200. In the case of installing the printer driver 100 in the client PC 400 by the server PC 200 using functions of the Windows OS, the customized data 14 in the PrinterDriverData registry 13 are synchronized with the client PC 400 from the server PC 200. The UI driver operates on the client PC 400. Therefore, it is possible to customize a UI screen. Accordingly, the printer driver 100 and the customization method of this embodiment may also be suitably applied to Point & Print.

In other words, when the customized data 14 are registered not with a registry but with a file that is not managed by the Windows OS, a system administrator needs to move the customized data 14 from the server PC 200 to the client PC 400 in Point & Print. This embodiment may be applied to Point & Print by registering the customized data 14 with the PrinterDriverData registry 13.

[Second Embodiment]

A description is given of a second embodiment. In this embodiment, a description is given of the printer driver 100 that enables authentication of the customized data 14 as well.

Figure 19:
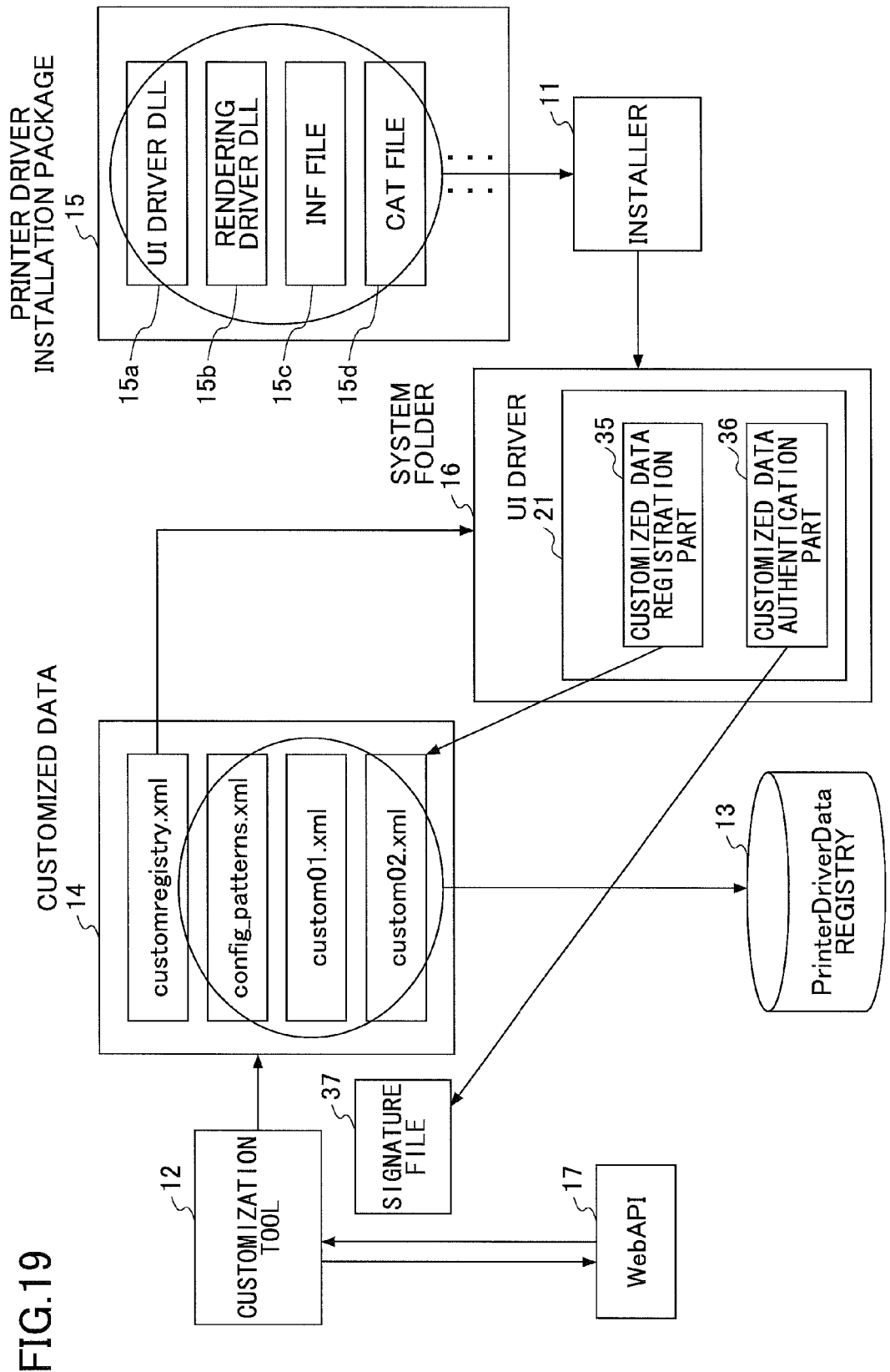
FIG. 19 is a schematic diagram illustrating functions of the client PC according to a second embodiment.

FIG. 19 is a schematic diagram illustrating functions of the client PC 400 according to this embodiment. FIG. 19 illustrates functions at the time of installing the printer driver 100 in the client PC 400. The functional block diagram after the installation of the printer driver 100 in the client PC 400 is the same as in the first embodiment.

Compared with FIG. 12, a signature file 37 is newly illustrated in the client PC 400 of this embodiment. The customization tool 12 of this embodiment accesses a Web API 17 provided by a printer manufacturer to create the digital signature of the customized data 14. The Web API 17, which is an API that is available via the Internet, exchanges a request and a response written in, for example, XML according to a protocol such as SOAP. The signature file 37 is a file in which a digital signature is written. Like the customized data 14, the signature file 37 is stored in a predetermined folder. The Web API 17 is an example, and a Web server may be used.

At the time of the installation of the printer driver 100, a customized data authentication part 36 of the UI driver 21 creates a digital signature from the customized data 14, and compares the created digital signature with the digital signature of the signature file 37, thereby authenticating the customized data 14. In the case of successful authentication, the customized data registration part 35 registers the customized data 14 with the PrinterDriverData registry 13.

Figure 20:
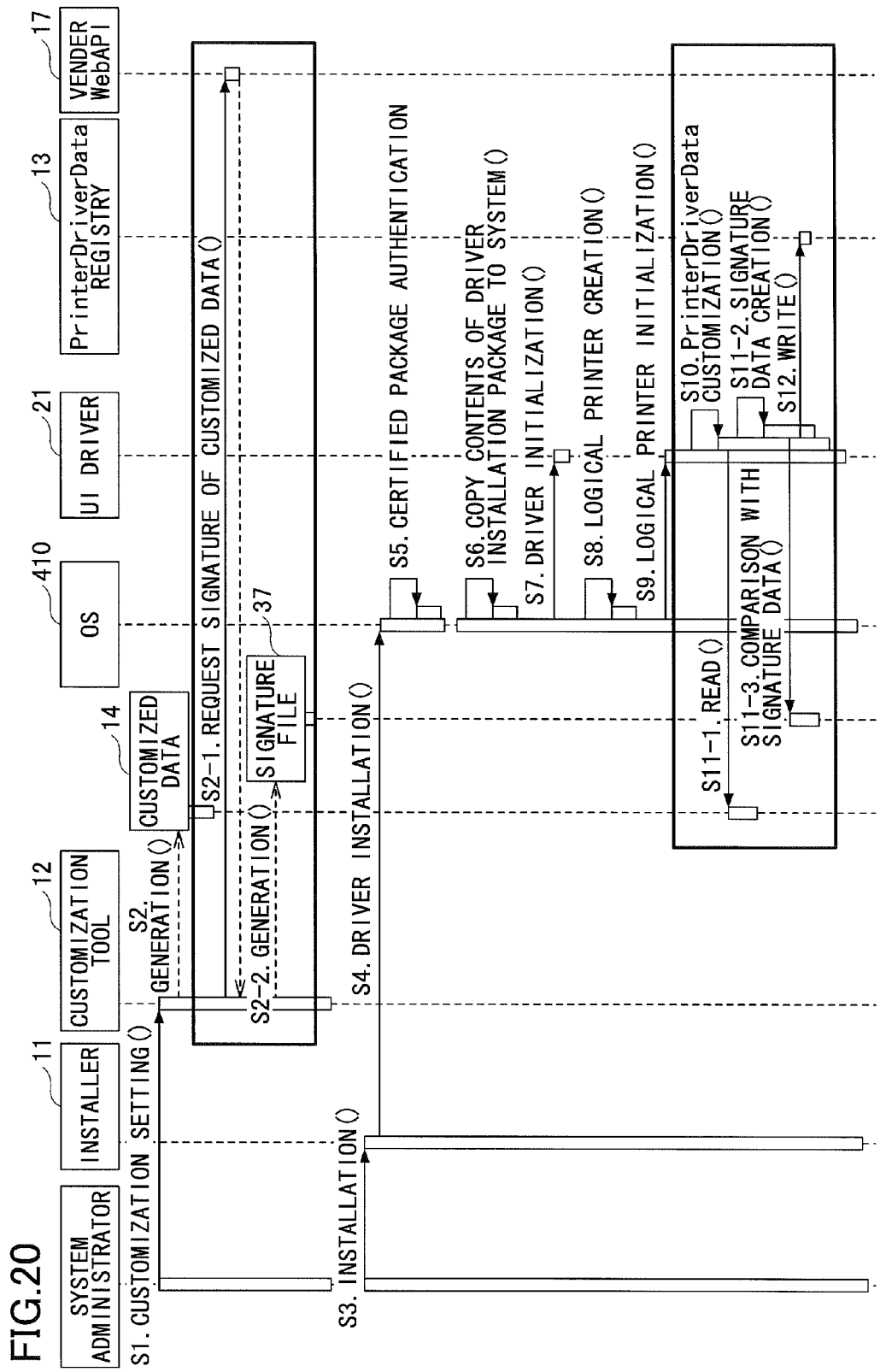
FIG. 20 is a sequence diagram illustrating a procedure for the installation of the package by the system administrator according to the second embodiment.

FIG. 20 is a sequence diagram illustrating a procedure for the installation of the package 15 by a system administrator. FIG. 20 is different from FIG. 14 in that the signature file 37 is generated after the generation of the customized data 14.

The customization tool 12 transmits a signature request along with the customized data 14 to the Web AIP 17 (step S2-1). This process may be executed manually by the system administrator. The Web API 17 generates a digital signature using a private key.

In response to obtaining the digital signature from the Web API 17, the customization tool 12 generates the signature file 37 (step S2-2). Thereafter, the system administrator starts installation. The process of steps S3 to S10 after the start of installation is the same as in the first embodiment.

Thereafter, the customized data authentication part 36 of the UI driver 21 reads the customized data 14 (step S11-1), and creates a digital signature (signature data) (step S11-2).

The customized data authentication part 36 reads the signature file 37, and compares the read signature file 37 with the created digital signature (step S11-3). If the signature file 37 matches the digital signature, the customized data registration part 35 registers the customized data 14 with the PrinterDriverData registry 13 (step S12).

Figure 21:
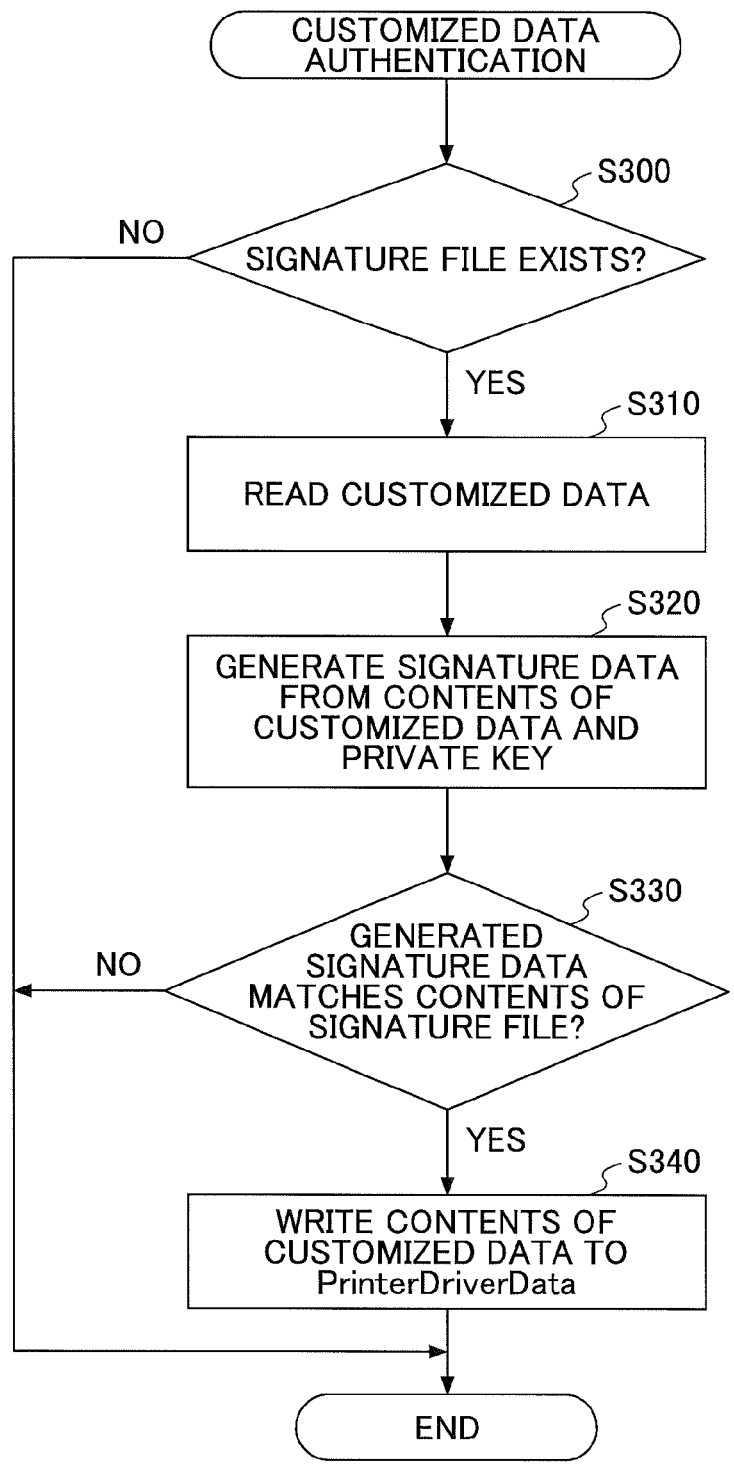
FIG. 21 is a flowchart illustrating a procedure for authenticating a signature file by a customized data authentication part according to the second embodiment.

FIG. 21 is a flowchart illustrating a procedure for authenticating the signature file 37 by the customized data authentication part 36.

First, at step S300, the customized data authentication part 36 determines whether the signature file 37 exists. If the signature file 37 does not exist in a predetermined folder (NO at step S300), the customized data authentication part 36 determines that it is not possible to execute authentication, and terminates the process.

If the signature file 37 exists in a predetermined folder (YES at step S300), at step S310, the customized data authentication part 36 reads the customized data 14.

Then, at step S320, the customized data authentication part 36 creates a digital signature using a private key from the contents of the customized data 14. The UI driver 21 has the same private key and employs the same signature algorithm as the Web API 17.

At step S330, the customized data authentication part 36 determines whether the generated digital signature matches the digital signature of the signature file 37. If the customized data 14 are altered or changed after the issuance of the digital signature by the Web API 17, the two digital signatures are different.

If the digital signatures do not match (NO at step S330), the customized data authentication part 36 determines that it is not possible to authenticate the customized data 14, and terminates the process.

If the digital signatures match (YES at step S330), at step S340, the customized data registration part 35 registers the customized data 14 with the PrinterDriverData registry 13.

Thus, according to this embodiment, besides the effects of the first embodiment, it is possible for the printer driver 100 to register the customized data 14 with the PrinterDriverData registry 13 after authenticating the customized data 14. Therefore, it is possible to further improve the reliability of the printer driver 100.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. An information processor, comprising:
a processor; and
a storage device including a first storage area in which a program is stored, the program being installed in the information processor through authentication based on a comparison of authentication information generated from a plurality of pre-certified files of the program and authentication information of the plurality of pre-certified files written in an authentication information file, the plurality of pre-certified files including the authentication information file and a first configuration file that defines an operation of the program,
wherein the program, when executed by the processor, causes the information processor to
search the information processor for a second configuration file, the second configuration file existing in the information processor at a time of the installation of the program and having a same file configuration as the first configuration file;
register configuration data written in the second configuration file with a second storage area different from the first storage area in which the program is stored, in response to locating the second configuration file by the search;
determine whether the configuration data are stored in the second storage area; and
reflect the configuration data in the operation of the program in response to determining that the configuration data are stored in the second storage area,
wherein the information processor is caused to register the configuration data in correlation with non-redundant logical printer information, the non-redundant logical printer information being generated by an operating system in order to identify a setting for a hardware item controlled by the information processor,
wherein the second configuration file is stored in a folder or a directory whose folder name or directly name includes the logical printer information, and
wherein the information processor is caused to register the configuration data in correlation with the logical printer information on a folder or directory basis.

2. The information processor as claimed in claim 1, wherein the information processor is caused to store the configuration data in a PrinterDriverData registry as the second storage area.

3. The information processor as claimed in claim 1, wherein the information processor is caused to, in response to determining that the configuration data are stored, reflect the configuration data in the operation of the program in preference to default configuration data written in the first configuration file in the first storage area.

4. The information processor as claimed in claim 1,
wherein multiple setting items are writable in the configuration data, and
wherein the information processor is caused to, when none of the setting items is written in the configuration data, read prescribed values of the setting items not written in the configuration data from a function management database.

5. The information processor as claimed in claim 1, wherein the information processor is cause to search for a configuration file instruction information file specifying a filename of the second configuration file, and to register the configuration data written in the second configuration file specified by the configuration file instruction information file with the second storage area.

6. The information processor as claimed in claim 1, wherein the information processor is caused to read a digital signature of the second configuration file, and to register the configuration data written in the second configuration file when the digital signature of the second configuration file matches a digital signature created from the second configuration file stored in the information processor.

7. The information processor as claimed in claim 1, wherein
the information processor is further caused to display a screen displaying and receiving a prescribed value of a function provided by a hardware item controlled by the information processor,
wherein the information processor is caused to create the screen using the configuration data when the configuration data are stored in the second storage area, and to create the screen using default configuration data written in the first configuration file when the configuration data are not stored in the second storage area.

8. The information processor as claimed in claim 1, wherein the first configuration file is a default configuration file of the program, and the second configuration file is a customized configuration file constructed outside a configuration of the program.

* * * * *